US012810667B2

(12) United States Patent
Horihata et al.

(10) Patent No.: US 12,810,667 B2
(45) Date of Patent: Nov. 24, 2026

(54) FAILURE PREDICTION INFORMATION OUTPUT CONTROL METHOD AND DEVICE

(71) Applicants: Nissan Motor Co., Ltd., Kanagawa (JP); RENAULT S.A.S., Boulogne-Billancourt (FR)

(72) Inventors: Yuki Horihata, Kanagawa (JP); Toru Takagi, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 46 days.

(21) Appl. No.: 18/867,178

(22) PCT Filed: Mar. 15, 2023

(86) PCT No.: PCT/IB2023/000113

§ 371 (c)(1),
(2) Date: Nov. 19, 2024

(87) PCT Pub. No.: WO2023/227938

PCT Pub. Date: Nov. 30, 2023

(65) Prior Publication Data

US 2025/0322702 A1 Oct. 16, 2025

(30) Foreign Application Priority Data

May 26, 2022 (JP) ................................ 2022-085680

(51) Int. Cl.
*G07C 5/12* (2006.01)
*G01C 21/36* (2006.01)
(Continued)

(52) U.S. Cl.
CPC ........... *G07C 5/12* (2013.01); *G01C 21/3676* (2013.01); *G06Q 10/20* (2013.01); *G07C 5/0808* (2013.01)

(58) Field of Classification Search
None
See application file for complete search history.

(56) References Cited

U.S. PATENT DOCUMENTS

2018/0197349 A1* 7/2018 Oesterling ............. G07C 5/008
2019/0206149 A1* 7/2019 Sakurada ............... G07C 5/008
(Continued)

FOREIGN PATENT DOCUMENTS

JP 2011198185 A * 10/2011
JP 2019-206247 A 12/2019

OTHER PUBLICATIONS

Translation of JP-2011198185-A (Year: 2011).*

*Primary Examiner* — Faris S Almatrahi
*Assistant Examiner* — Selena M Jin
(74) *Attorney, Agent, or Firm* — Osha Bergman Watanabe & Burton LLP

(57) ABSTRACT

Failure prediction information output control device has a failure prediction unit (6) predicting failure of vehicle based on vehicle signal, a failure time estimation unit (7) estimating a time when the failure of the vehicle occurs based on the predicted failure, a data base (2) storing identification information of a management and repair participant of the vehicle, an occupant detection unit (3) detecting identification information of an occupant, a judgment unit (4) judging whether the occupant is the management and repair participant, and an output control unit (9) which, when it is judged that the time when the failure of the vehicle occurs in a case where the occupant is a user who is not the management and repair participant at a time when the failure of the vehicle is predicted is out of a vehicle usage period, does not output notification information about the predicted failure to the occupant.

16 Claims, 18 Drawing Sheets

(51) Int. Cl.
*G06Q 10/20* (2023.01)
*G07C 5/08* (2006.01)

(56) References Cited

U.S. PATENT DOCUMENTS

| | | | | |
|---|---|---|---|---|
| 2019/0276031 | A1* | 9/2019 | Hirose | B60W 50/0098 |
| 2020/0013237 | A1* | 1/2020 | Kanbe | G07C 5/006 |
| 2020/0223439 | A1* | 7/2020 | Sakai | G05D 1/0055 |
| 2021/0370870 | A1* | 12/2021 | Furuta | E05B 49/00 |
| 2021/0370939 | A1* | 12/2021 | Boyer | B60K 28/10 |
| 2022/0058891 | A1* | 2/2022 | Ha | G07C 5/12 |
| 2022/0097650 | A1* | 3/2022 | Hanzaki | B60K 35/10 |
| 2022/0114560 | A1* | 4/2022 | Senzer | G07C 5/085 |
| 2022/0212630 | A1* | 7/2022 | Namiki | B60L 53/20 |
| 2023/0182772 | A1* | 6/2023 | Funke | B60W 60/0015 701/23 |

* cited by examiner

| | |
|---|---|
| ABNORMALITY TYPE | ENGINE MISFIRE |
| TRAVELABLE DISTANCE | 30km |

REPLACEMENT COMPONENT CANDIDATE

| REPLACEMENT COMPONENT CANDIDATE | INVENTORY STATUS (EARLIEST ARRIVAL DATE) | COMPONENT COST (LOWEST COST) |
|---|---|---|
| MODEL NUMBER 1 | IN STOCK | ¥36000 |
| MODEL NUMBER 2 | 2 WEEKS LATER | ¥52000 |

10

PREDICTED FAILURE COMPONENT AND COMPONENT INFORMATION

ABNORMALITY TYPE : ENGINE MISFIRE
FAILURE COMPONENT : INJECTOR
CONTENT OF MAINTENANCE : REPLACEMENT OF INJECTOR

FAILURE PREDICTION INFORMATION OUTPUT CONTROL METHOD AND DEVICE

TECHNICAL FIELD

The present invention relates to a failure prediction information output control method and its device which acquire notification information about a predicted vehicle failure and control an output of the notification information on the basis of whether or not an occupant is a person involved in management and repair (a management and repair participant).

BACKGROUND ART

Patent Document 1 discloses a failure prediction method of predicting a vehicle failure and a time of the failure on the basis of vehicle signals that indicate vehicle characteristics. In this failure prediction, after the vehicle failure and the failure time are predicted, a vehicle user is notified of measures to be taken before entering the failure time.

In Patent Document 1, even when the predicted vehicle failure time is out of a vehicle usage period and there is no need to take immediate action in preparation for the vehicle failure, at a time when the vehicle failure and the failure time are predicted, the vehicle user is notified of measures to be taken. Because of this, the vehicle user has to pay attention to the notified vehicle failure and failure time, then there is a risk that driver's attention to the driving will be reduced.

Further, in general, the vehicle user is provided with route information and/or road traffic information from a car navigation system. Therefore, when the provision of the route information and/or the road traffic information are stopped by giving priority to the notification of the failure and the failure time to the vehicle user, there arises a problem of suppressing efficient driving of the vehicle user.

The present invention was made in view of the above problems. An object of the present invention is therefore to provide a failure prediction information output control method and its device which are capable of safe and efficient drive of the vehicle user even when the vehicle failure is predicted.

CITATION LIST

Patent Document

Patent Document 1: Japanese Unexamined Patent Application Publication No. JP2019-206247

SUMMARY OF THE INVENTION

The present invention relates to a failure prediction information output control method. This method comprises: predicting a failure of a vehicle based on a vehicle signal that indicates characteristics of the vehicle; estimating a time when the failure of the vehicle occurs based on the predicted failure; acquiring identification information of a management and repair participant of the vehicle who has an authority or an obligation to request for repair for the failure of the vehicle and is involved in the repair by receiving the request; detecting identification information of an occupant of the vehicle; comparing the detected identification information of the occupant and the acquired identification information of the management and repair participant of the vehicle; and when it is judged that the time when the failure of the vehicle occurs in a case where the occupant is a user who is not the management and repair participant of the vehicle at a time when the failure of the vehicle is predicted is out of a vehicle usage period, not outputting notification information about the predicted failure to the occupant.

According to the present invention, even when the vehicle failure is predicted, the vehicle user can drive the vehicle safely and efficiently.

EMBODIMENTS FOR CARRYING OUT THE INVENTION

Embodiments of the present invention will be described in detail below. In the following embodiment, as an example, the present invention is applied to a vehicle when a person involved in management and repair (a management and repair participant) of the vehicle temporarily lends the vehicle to a user of the vehicle who is not the person involved in management and repair (the management and repair participant). The management and repair participant is a person (referred to as "manager" too) having an authority or an obligation to make arrangements or request for repair or inspection for abnormality or failure (hereinafter collectively referred to as "failure") of the vehicle and a person (referred to as "repairman" too) involved in the repair or the inspection by receiving the request. The management and repair participant includes, for instance, a vehicle owner, a person responsible for management of the vehicle (a manager or a keeper), a person responsible for the vehicle in a rental car company or a vehicle dispatch service, a person responsible for the vehicle in a taxi company, a person in charge of maintenance in an automobile sales company, a worker in a repair shop, etc. The user of the vehicle who is not the person involved in management and repair (the management and repair participant) is a person who rents the vehicle from the manager for charge or for free and uses the vehicle. The user of the vehicle who is not the management and repair participant includes, for instance, a customer (a user) of the rental car company or the vehicle dispatch service, a child who uses parent's vehicle, a friend who uses the vehicle of the manager, etc. The entire failure prediction information output control device according to one embodiment is configured as a cloud system including, besides a computer system 1 mounted on the vehicle itself, for instance, a cloud server managed by an automobile manufacturer and a portable device such as a smart phone owned by the repairman. The vehicle is configured as a so-called connected vehicle in order to be able to exchange necessary information among them.

Figure 1:
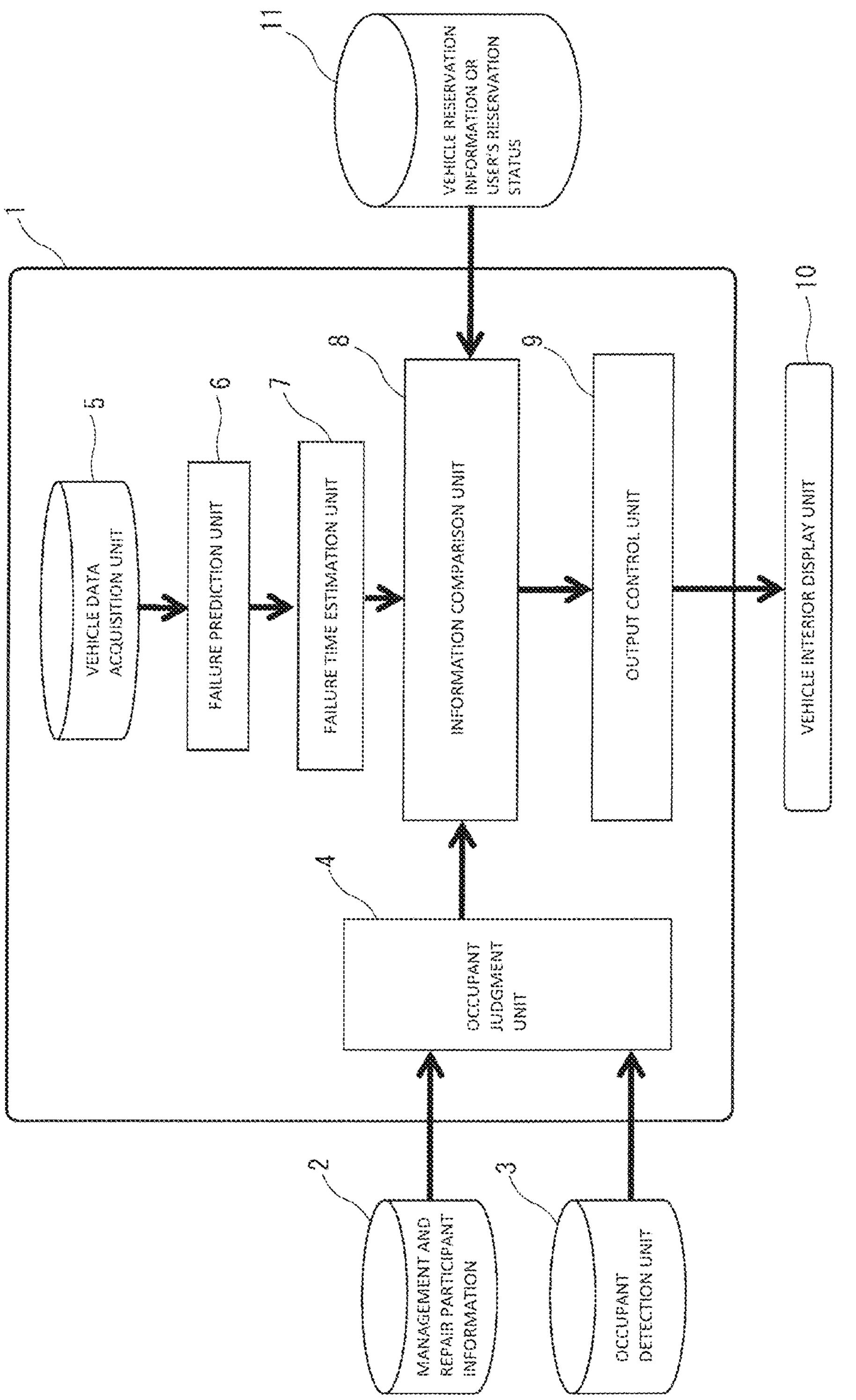
FIG. 1 is a functional block diagram of a failure prediction information output control device according to a first embodiment.

FIG. 1 is a functional block diagram of the failure prediction information output control device according to a first embodiment. This failure prediction information output control device has a management and repair participant data base 2, an occupant detection unit 3, an occupant judgment unit 4, a vehicle data acquisition unit 5, a failure prediction unit 6, a failure time estimation unit 7, an information comparison unit 8 and an output control unit 9. It is noted that the occupant judgment unit 4, the vehicle data acquisition unit 5, the failure prediction unit 6, the failure time estimation unit 7, the information comparison unit 8 and the output control unit 9 form a part of the computer system 1 provided in the vehicle. Further, this failure prediction information output control device could include a display unit (such as a vehicle-mounted display, a portable device such as a smart phone, an external PC, etc.) for displaying necessary information. In the present embodiment, this display unit is a unit provided in a vehicle interior, and this is shown as "VEHICLE INTERIOR DISPLAY UNIT 10".

The management and repair participant data base 2 is a storage unit that stores identification information of the management and repair participants of the vehicle. The identification information is, for instance, information (including biological information) linked to an individual such as a facial photograph, fingerprint information, an ID number and an employee number of the management and repair participant. In order to make identification more accurately, the management and repair participant data base 2 may have identification information of a person (people) other than the management and repair participant. The management and repair participant data base 2 is provided outside the vehicle in many cases, but could be included in the computer system 1 of the vehicle.

The occupant detection unit 3 is a unit that detects an occupant actually riding in the vehicle and acquires its identification information. The occupant detection unit 3 includes an occupant recognition device such as an in-vehicle camera like a driver-monitoring, a fingerprint recognition device and a touch panel for inputting the ID number.

The occupant judgment unit 4 judges whether or not the occupant is the person involved in management and repair (the management and repair participant) of the vehicle based on the identification information of the occupant acquired by the occupant detection unit 3 and the identification information stored in the management and repair participant data base 2. For instance, a method for identifying the occupant from a degree of match between the facial photograph information stored in the management and repair participant data base 2 and image information of the occupant acquired by the in-vehicle camera, and a method for comparing the ID number input by the occupant with the information of the management and repair participant data base 2, are possible. Facial recognition technology performs matching by deriving a degree of similarity (correlation) of e.g. positions of features of eyes, nose and mouth and/or a size of a facial area. If the degree of similarity is a predetermined threshold value or more, the occupant judgment unit 4 judges that the occupant is the management and repair participant. If the degree of similarity is less than the predetermined threshold value, the occupant judgment unit 4 judges that the occupant is a user other than the management and repair participant. Further, it is also possible to judge the occupant from a degree of match between fingerprint registered in the management and repair participant data base 2 and fingerprint authenticated by the in-vehicle device or according to whether or not the ID number and/or a login-password input to the management and repair participant data base 2 and a number and/or a login-password input to the in-vehicle device match. In addition, it is also possible to judge the occupant according to whether or not user's reservation number of the vehicle acquired by an external terminal 11 provided outside the vehicle and a reservation number input to the in-vehicle device match.

As a preferable embodiment, the occupant detection unit 3 and the occupant judgment unit 4 judge whether or not each of all occupants in the vehicle interior is the management and repair participant of the vehicle, and further identify on which seat(s) in the vehicle interior the management and repair participant(s) is/are seated. As a simply embodiment, the occupant detection unit 3 and the occupant judgment unit 4 may be configured to identify whether or not only an occupant seated on driver's seat or only occupants seated on the driver's seat and a front passenger seat is/are the management and repair participant(s).

The vehicle data acquisition unit 5 is a unit that acquires, during operation (driving) of the vehicle (including, vehicle travel and temporary stop), vehicle data (vehicle signals indicating vehicle characteristics) used for prediction of failure of a vehicle component (vehicle parts) which may occur in the feature. For instance, the vehicle data acquisition unit 5 collects, as the vehicle data, output signals of existing sensors provided at a powertrain, a suspension, an air conditioning system, various devices, electrical components, etc. in the vehicle or internal signals of a control unit that controls these. The failure prediction unit 6 detects an omen (or a portent) of failure of the vehicle component (the vehicle parts) based on such collected vehicle data, and makes a prediction of the failure. When making this prediction of the failure, contents of malfunction (for instance, type of abnormality illustrated in FIGS. 2 and 3) which may occur due to the failure of the component are also predicted.

As a method of predicting the failure, various methods have been known according to a target portion or device, and a proper known method can be used. For instance, they are a method for detecting a value that deviates from a threshold value of each signal from among time-series data including an engine rotation speed and an engine temperature according to a predetermined condition or rule, a method for performing an invariant analysis, i.e. looking at a correlation of a plurality of signals and detecting a timing when a part of the correlation is broken, a method for judging a vehicle condition (whether normal or abnormal) using machine learning, etc. Besides these methods, any method is possible as long as it is a method for predicting the failure. It is noted that as the prediction of the failure, there is no need to predict that the vehicle component has completely failed, but although the component does not reach a complete failure such as an unusual noise or vibration, a condition of the component that may fail could be predicted.

In addition to the prediction of the failure, the failure prediction unit 6 estimates a cause of the failure, a vehicle signal(s) when the failure is predicted, a failure occurrence portion, a failure component name or a failure component code and a repair cost. These estimation of the cause of the failure etc. are performed by previously storing e.g. past causes of failure, past vehicle signals when the failure was predicted, past failure occurrence portions, past failure component names or past failure component codes and past repair costs for each vehicle component in a data base and referring to these information in this data base. Further, in addition to the estimation of the cause of the failure etc., a route to a repair place and a candidate for a repairable point are previously acquired. The route to the repair place is acquired based on a position information of the vehicle and the occupant which is acquired by GPS (not shown) and an application (including map information) previously installed in the computer system 1. The candidate for the repairable point is acquired by the application including the map information.

The failure time estimation unit 7 estimates a time when a failure occurs (hereinafter referred to as "failure occurrence time") by predicting a future vehicle travelling condition (or a future vehicle travelling state) when the failure is predicted by the failure prediction unit 6. The future vehicle travelling condition is a travelable range or a travelable time range which can be quantitatively indicated by a travelable distance or a travelable time etc. from a current vehicle condition until the failure actually occurs in a case where the vehicle continues travelling without being repaired. Therefore, a time when the future vehicle travelling condition is out of the travelable range or the travelable time range can be regarded as the "failure occurrence time" of the vehicle. Further, when estimating the failure occurrence time, the estimation is not performed using one of the travelable range and the travelable time range, but could be performed by combining both these travelable range and travelable time range.

The external terminal 11 stores reservation information including user's reservation number of a vehicle of the rental car company, a usage period of the vehicle (or a usage period of an occupant) etc. The usage period of the vehicle may be estimated from an effective period of insurance of the reserved vehicle, a period from an occupant boarding (riding) time (or a usage start time) to a getting-out point (a destination) set in a car navigation system or service, and so on. Then, if the usage period of the vehicle can be acquired by the external terminal 11 or the above estimation, the usage period of the vehicle is input to the information comparison unit 8. If the usage period of the vehicle cannot be acquired, an input instruction of the usage period to the occupant is displayed on the vehicle interior display unit 10.

When a judgment result of the occupant by the occupant judgment unit 4 is a user who is not the person involved in management and repair (the management and repair participant) of the vehicle, but is e.g. a user (a customer) of the rental car company, the information comparison unit 8 acquires a future vehicle usage period of the user who is not the management and repair participant of the vehicle from the external terminal 11, and compares the failure occurrence time and the vehicle usage period. Then, on the basis of this comparison, the information comparison unit 8 judges which of the failure occurrence time judged by the failure time estimation unit 7 or the future usage period occurs earlier.

The output control unit 9 controls an output of information on the predicted vehicle component failure based on the judgment result of the occupant judgment unit 4 and the comparison result of the information comparison unit 8. When it is judged that the failure occurrence time in a case where the occupant is the user who is not the management and repair participant of the vehicle at a time when the vehicle failure is predicted is out of the vehicle usage period, the output control unit 9 does not output notification information including the vehicle failure and the vehicle failure occurrence time to the occupant. That is, when the occupant judgment unit 4 judges that the occupant is the user who is not the management and repair participant of the vehicle and also the information comparison unit 8 judges that the estimated failure occurrence time is later than the usage period of the user, the output control unit 9 restricts the output of the information on the predicted vehicle component failure to the vehicle interior display unit 10. For instance, when the usage period of the occupant using the vehicle at a time when the vehicle component failure is predicted is 12:00 to 18:00 and the failure occurrence time estimated by the failure time estimation unit 7 is 20:00 on the same day, the output control unit 9 does not notify the user who is not the management and repair participant of the vehicle of the notification information on the predicted vehicle component failure.

Further, when the occupant judgment unit 4 judges that the occupant is the user who is not the management and repair participant of the vehicle and also the information comparison unit 8 judges that the estimated failure occurrence time occurs within the usage period of the user, the output control unit 9 outputs the notification information including the predicted vehicle failure and the estimated vehicle failure occurrence time and information that the vehicle cannot reach the destination to the vehicle interior display unit 10. For instance, when the usage period of the occupant using the vehicle at a time when the vehicle component failure is predicted is 12:00 to 18:00 and the failure occurrence time estimated by the failure time estimation unit 7 is 17:00 on the same day, the output control unit 9 outputs a message that, for instance, "Due to vehicle failure, the vehicle may not be able to reach the destination. Please stop immediately at a safe place." to the vehicle interior display unit 10.

Furthermore, when the occupant judgment unit 4 judges that the occupant is the manager involved in management of the vehicle among the management and repair participant of the vehicle, the information comparison unit 8 does not perform the comparison of the information, and the output control unit 9 outputs notification information including the time when the failure is predicted, the cause of the failure, the repair cost, the route to the repair place, the candidate for the repairable point and a repair reservation screen to the vehicle interior display unit 10. Here, the notification information does not necessarily need to include all of the information such as the time when the failure is predicted, but may include at least one of the information such as the time when the failure is predicted. In addition, the notification information is not limited to the time when the failure is predicted etc., but could include other information about the failure.

Moreover, when the occupant judgment unit 4 judges that the occupant is the repairman involved in repair of the vehicle among the management and repair participant of the vehicle, the information comparison unit 8 does not perform the comparison of the information, and the output control unit 9 displays notification information including the time when the failure is predicted, the cause of the failure, the vehicle signal(s), the failure occurrence portion and the failure component name or the failure component code. Here, the notification information does not necessarily need to include all of the information such as the time when the failure is predicted, but may include at least one of the information such as the time when the failure is predicted. In addition, the notification information is not limited to the time when the failure is predicted etc., but could include other information about the failure.

Here, with reference to FIG. 2, a part of the notification information output to the vehicle interior display unit 10 when the occupant is the manager will be described. At an upper portion of the vehicle interior display unit 10 in FIG. 2, a map including routes to repair places (repairable points) to be directed when a failure of a vehicle component (in this embodiment, an injector) is predicted is displayed. The routes to the repair places are shown as routes to first to third repair places P1, P2 and P3 from a point A where the failure of the injector has been predicted, and these are determined, in order of shortest travel distance, as a "highest priority route (first recommendation route) R1", a "second recommendation route R2" and a "third recommendation route R3". In this example, a travel distance from the point A to the first repair place P1 is 2.3 km, a travel distance from the point A to the second repair place P2 is 3.3 km, and a travel distance from the point A to the third repair place P3 is 3.7 km. Therefore, the route whose travel distance from the point A to the first repair place P1 is shortest is the highest priority route R1. The route whose travel distance from the point A to the second repair place P2 is the second shortest is the second recommendation route R2. The route whose travel distance from the point A to the third repair place P3 is longest is the third recommendation route R3.

Figure 2:
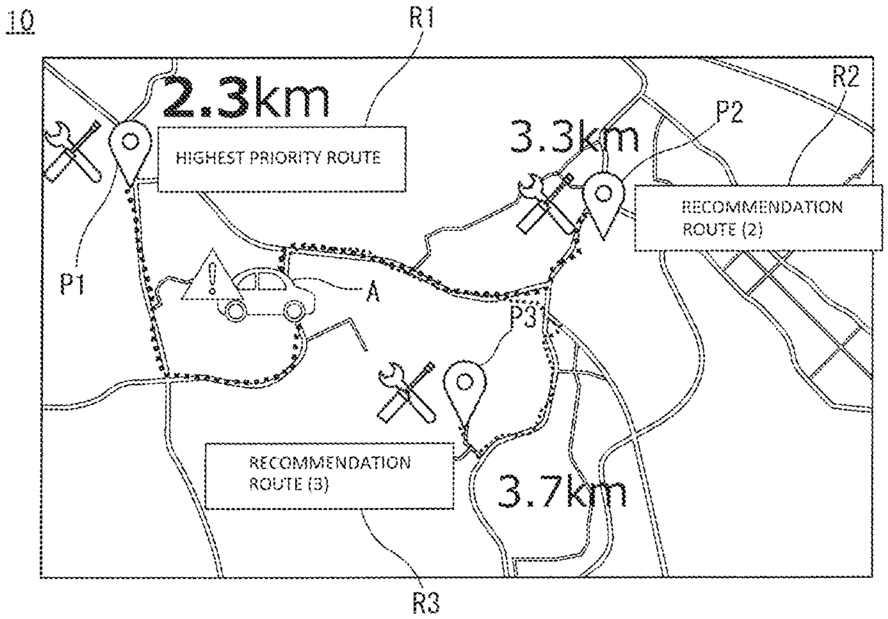
FIG. 2 is an explanatory drawing showing an example of notification information that is output when an occupant is a manager (a keeper).

Further, at a middle portion of the vehicle interior display unit 10 in FIG. 2, an abnormality type of the vehicle indicating type of abnormality (malfunction) that may actually occur in the vehicle due to the predicted injector failure, and a travelable distance from the point where the failure is predicted, are displayed. In this example, the abnormality type is engine misfire (engine failure), and the travelable distance is 30 km.

In addition, at a lower portion of the vehicle interior display unit 10 in FIG. 2, a table showing replacement of the injector is displayed as one example of repair performed for the injector whose failure has been predicted. In this example, model numbers (component codes) for determining type of the injector, which is a replacement component, are shown in boxes of a replacement component candidate. Here, in this example, although detailed display of the model number (the component code) is not omitted, the model number (the component code) is generally indicated by combination of number and alphabet. Further, inventory statuses of model numbers 1 and 2 of the replacement component candidates are shown in boxes of an inventory status (an earliest arrival date). In addition, the lowest costs of the replacement (the repair) of the model numbers 1 and 2 are shown in boxes of a component cost (the lowest cost).

Further, when the occupant judgment unit 4 judges that the occupant is the repairman, the output control unit 9 outputs information such as the time when the failure is predicted, the cause of the failure, the vehicle signal(s), the failure occurrence portion and the failure component name or the failure component code, which is useful for the repair or the replacement of the vehicle component and analysis of the cause of the failure. Here, the time when the failure is predicted is shown by a graph indicating a degree of progress of the failure with respect to a remaining travelable distance from the time of the prediction of the failure of the vehicle component (see FIG. 3).

Figure 3:
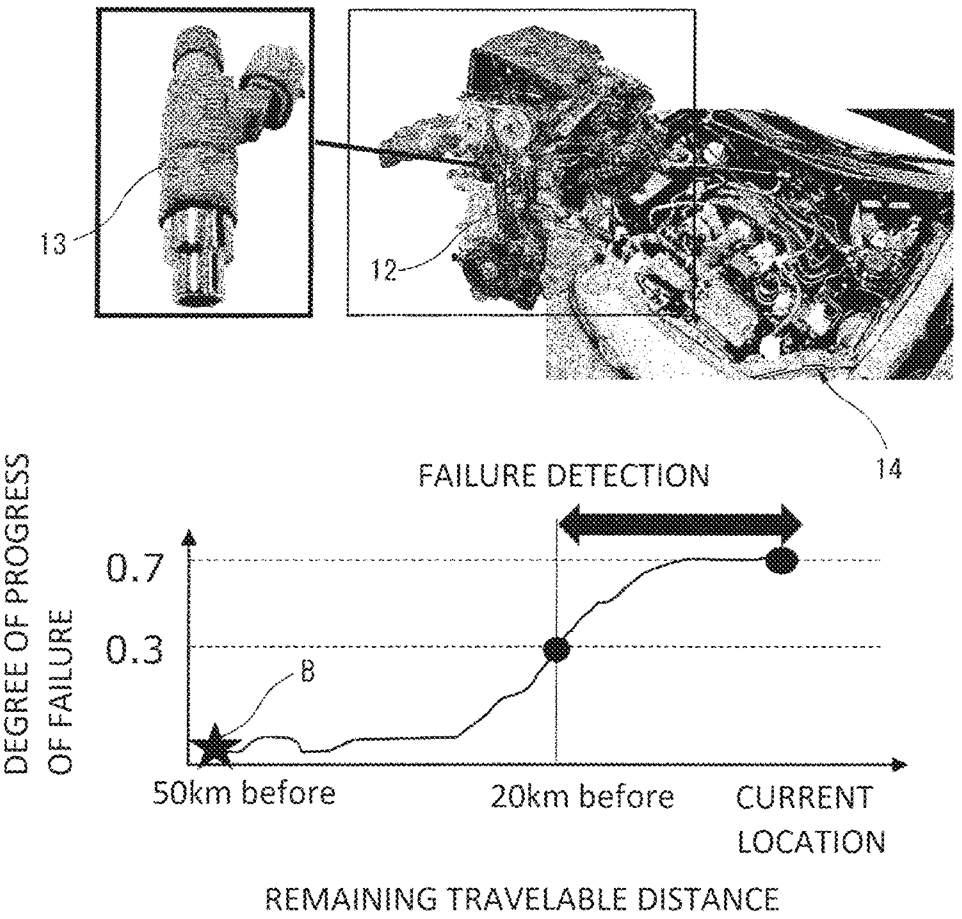
FIG. 3 is an explanatory drawing showing an example of notification information that is output when an occupant is a repairman.

Here, with reference to FIG. 3, a part of the notification information output to the vehicle interior display unit 10 when the occupant is the repairman will be described. At an upper portion of the vehicle interior display unit 10 in FIG. 3, "abnormality type is misfire of engine 12 (engine failure)", "component whose failure has been predicted (failure component) is injector 13" and "content of maintenance is replacement of injector 13" are displayed. At a middle portion of the vehicle interior display unit 10 in FIG. 3, the engine 12 arranged in an engine room 14 and the injector 13 to be replaced are shown. Further, at a lower portion of the vehicle interior display unit 10 in FIG. 3, the graph indicating the degree of progress of the failure with respect to the remaining travelable distance from a time B when the failure of the injector 13 has been predicted until the failure of the injector 13 actually occurs is displayed. In this example, the failure of the injector 13 is predicted at a timing when the remaining travelable distance is 50 km, and the failure of the injector 13 actually occurs at a timing when the remaining travelable distance is 20 km. In this example, when the remaining travelable distance is shifted from 50 km to 20 km, i.e. when the vehicle travels by 30 km (see FIG. 2) that is the aforementioned travelable distance, the degree of progress of the failure reaches 0.3 that is a predetermined threshold value, and after that, an actual failure of the injector 13 is detected. It is noted that although the predetermined threshold value is used as a judgment reference of the failure in FIG. 3, a degree of deviation from this threshold value or a degree of similarity with respect to this threshold value may be displayed, or these may be converted into a probability of occurrence of the failure. Further, in addition to the information shown in FIG. 3, notification for calling driving attention and encouraging early maintenance may be displayed.

Figure 4:
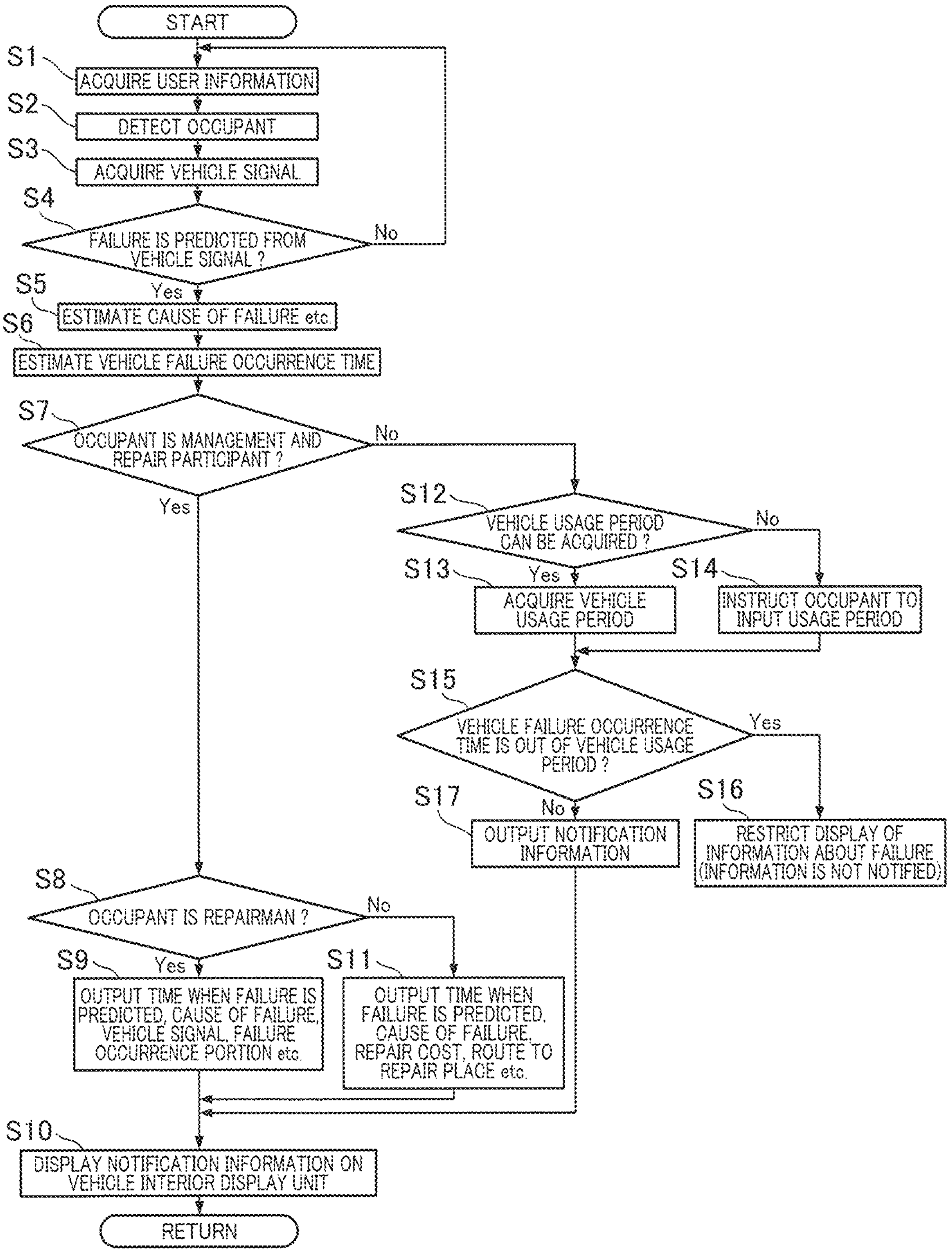
FIG. 4 is a flow chart showing a process flow according to the first embodiment.

FIG. 4 is a flow chart showing a flow of process of the failure prediction information output control device according to the first embodiment. The process shown in this flow chart is repeated in the computer system 1 mounted on the vehicle.

First, at step S1, user information is acquired. That is, the vehicle-side computer system 1 reads necessary data from the external management and repair participant data base 2.

Next, at step S2, an occupant(s) is detected. That is, the occupant(s) actually riding in the vehicle is detected by the occupant detection unit 3, and its identification information is acquired from occupant detection unit 3.

At step S3, a vehicle signal(s) is acquired from the vehicle data acquisition unit 5. At step S4, on the basis of the acquired vehicle signal(s), a failure of a vehicle component is predicted. If the failure is not predicted at step S4, the routine is returned to step S1.

If the failure is predicted at step S4, at step S5, a cause of the failure, a vehicle signal(s) when the failure is predicted, a failure occurrence portion, a failure component name or a failure component code and a repair cost are estimated.

Next, at step S6, on the basis of the predicted component failure, a failure occurrence time of the vehicle is estimated. That is, by predicting a future vehicle travelling condition when the failure is predicted by the failure prediction unit 6, the failure occurrence time of the vehicle is estimated.

After estimating the failure occurrence time, at step S7, a judgment is made as to whether or not the occupant(s) is a person involved in management and repair (a management and repair participant) of the vehicle. That is, on the basis of the identification information of the occupant acquired by the occupant detection unit 3 and identification information stored in the management and repair participant data base 2, the occupant judgment unit 4 judges whether or not the occupant(s) is the management and repair participant(s) of the vehicle. If it is judged that the occupant(s) is the management and repair participant(s) of the vehicle at step S7, at step S8, a judgment is made as to whether or not the occupant(s) is a repairman. If it is judged that the occupant(s) is the repairman, at step S9, a time when the failure is predicted, the cause of the failure, the vehicle signal(s), the failure occurrence portion and the failure component name or the failure component code are output as notification information. Then, at step S10, this notification information is displayed on the vehicle interior display unit 10.

If it is judged that the occupant(s) is not the repairman, i.e. the occupant(s) is a manager of the vehicle at step S8, at step S11, the time when the failure is predicted, the cause of the failure, the repair cost, a route(s) to a repair place(s), a candidate(s) for a repairable point(s) and a repair reservation screen are output as notification information. Then, at step S10, this notification information is displayed on the vehicle interior display unit 10.

If it is judged that the occupant(s) is a user who is not the management and repair participant at step S7, at step S12, a judgment is made as to whether or not a usage period of the vehicle can be acquired. If it is judged that the usage period of the vehicle can be acquired, at step S13, the usage period of the vehicle is acquired.

If it is judged that the usage period of the vehicle cannot be acquired at step S12, at step S14, an input instruction of the usage period to the occupant is displayed on the vehicle interior display unit 10.

Next, at step S15, a judgment is made as to whether or not the vehicle failure occurrence time is out of the vehicle usage period. That is, the information comparison unit 8 judges whether or not the vehicle failure occurrence time is later than the vehicle usage period. If it is judged that the vehicle failure occurrence time is later than the vehicle usage period, at step S16, display of the information about the failure on the vehicle interior display unit 10 is restricted, i.e. the information about the failure is not notified.

If it is judged that the vehicle failure occurrence time is not later than the vehicle usage period at step S15, since the vehicle failure occurrence time occurs within the vehicle usage period, at step S17, notification information including information that the vehicle cannot reach a destination and a stop instruction is output. Then, at step S10, this notification information is displayed on the vehicle interior display unit 10.

As described above, in the present embodiment, when it is judged that the failure occurrence time in the case where the occupant is the user who is not the management and repair participant of the vehicle at the time when the vehicle failure is predicted is out of the vehicle usage period, notification information including the vehicle failure and the vehicle failure occurrence time is not output to the occupant. Therefore, the user of the vehicle can continue driving the vehicle safely without reducing driver's attention to the driving due to the notification information that does not need to be confirmed within the usage period. Further, when priority of notification of the notification information including the failure and the failure occurrence time is higher than priority of provision of route information and/or road traffic information from the car navigation system, if the notification information is not notified, the route information etc. are acquired. Therefore, the user of the vehicle can continue driving the vehicle efficiently by utilizing the route information etc.

Further, in the present embodiment, when it is judged that the failure occurrence time in the case where the occupant is the user who is not the management and repair participant of the vehicle at the time when the vehicle failure is predicted is within the vehicle usage period, notification information including the vehicle failure and the vehicle failure occurrence time is output to the occupant. Therefore, the user of the vehicle can immediately confirm the notification information when a response to the vehicle failure is required, and can take measures early against the vehicle failure.

Furthermore, in the present embodiment, when the occupant is the repairman, the notification information including the time when the failure is predicted, the cause of the failure, the vehicle signal(s), the failure occurrence portion and the failure component name or the failure component code is displayed on the vehicle interior display unit 10. Therefore, the repairman can acquire, inside the vehicle, information necessary for repair or replacement of the vehicle component and analysis of the cause of the failure etc. without requiring other diagnostic devices for the vehicle failure.

Moreover, in the present embodiment, when the occupant is the manager, the notification information including the time when the failure is predicted, the cause of the failure, the repair cost, the route(s) to the repair place(s), the candidate(s) for the repairable point(s) and the repair reservation screen is displayed on the vehicle interior display unit 10. Therefore, the manager can smoothly take action for performing the repair, e.g. moving to the repair place, preparing cost for the replacement of the component.

In addition, in the present embodiment, when it is judged that the occupant is the user who is not the management and repair participant of the vehicle and also the vehicle failure occurrence time is within the vehicle usage period, the notification information that the vehicle cannot reach the destination is output. Therefore, the user can recognize that schedule should be changed. In addition, since the user is notified in advance that the vehicle cannot reach the destination, the user can consider, in advance, action to be taken for change of a plan due to predicted failure.

Additionally, in the present embodiment, when it is judged that the occupant is the user who is not the management and repair participant of the vehicle and also the vehicle usage period is unknown, by asking the occupant to input the vehicle usage period, the vehicle usage period is acquired. Therefore, even when the vehicle usage period has not been input in advance, the vehicle usage period can be surely acquired, and accurate judgment as to the presence or absence of the restriction of the notification information at subsequent steps can be made.

Next, a second embodiment will be described with reference to FIGS. 5 and 6.

Figure 5:
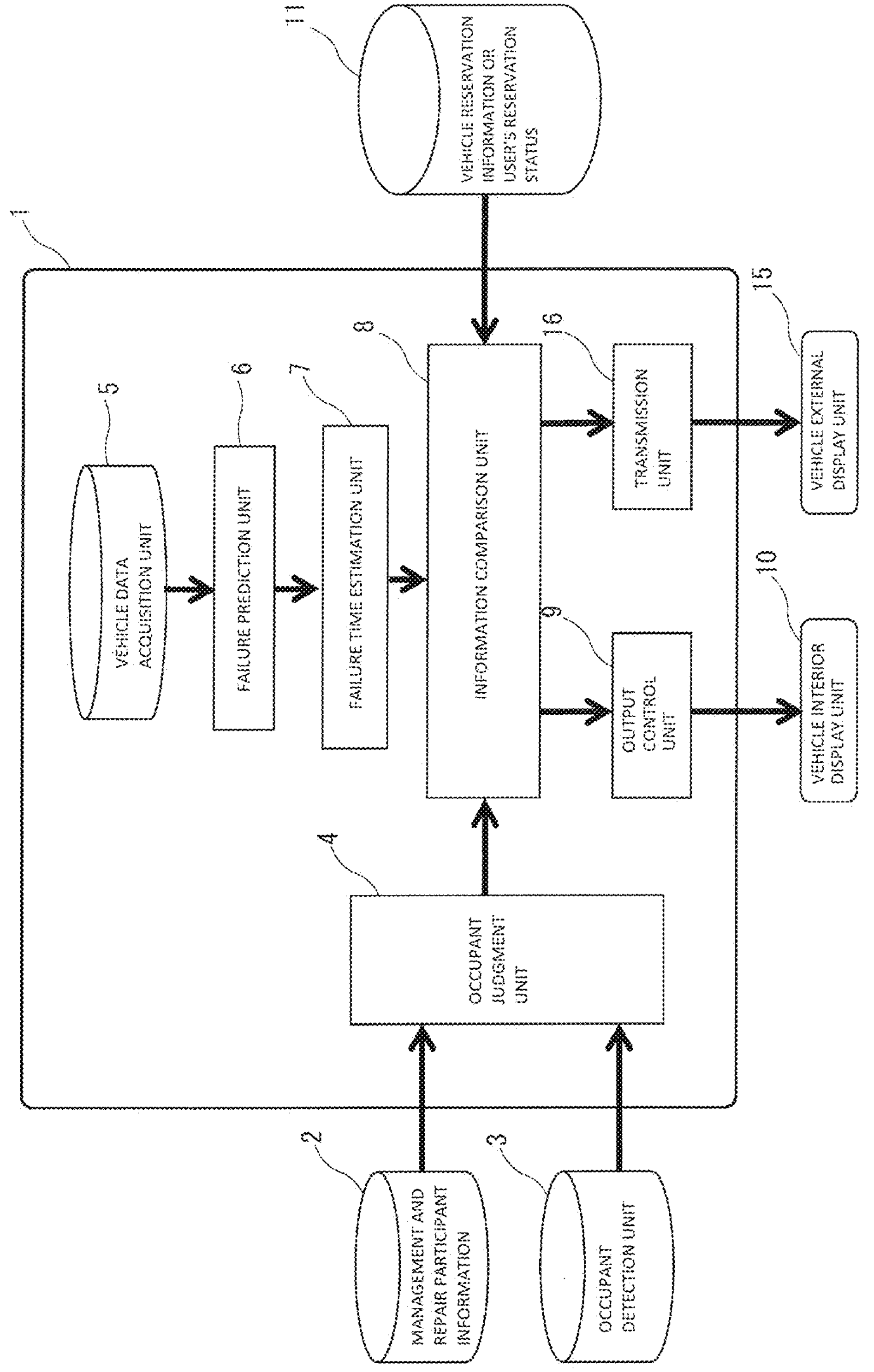
FIG. 5 is a functional block diagram of a failure prediction information output control device according to a second embodiment.

FIG. 5 is a functional block diagram of a failure prediction information output control device according to the second embodiment. In the second embodiment, in addition to the configuration of the failure prediction information output control device of the first embodiment, the failure prediction information output control device further has a transmission unit 16 that notifies a vehicle external display unit 15 (a portable device such as a smart phone and PC owned by the management and repair participant of the vehicle) provided outside the vehicle of information. When a failure of the vehicle component occurs, i.e. when the failure which was predicted by the failure prediction unit 6 has already occurred and malfunction caused by this failure has occurred, regardless of the comparison result by the information comparison unit 8, the transmission unit 16 notifies the management and repair participant of the vehicle of notification information for dealing with the failure. More specifically, notification information including the time when the failure is predicted, the cause of the failure, the repair cost, the route(s) to the repair place(s), the candidate(s) for the repairable point(s) and the repair reservation screen is displayed on the vehicle external display unit 15 owned by the manager of the vehicle. Further, notification information including the time when the failure is predicted, the cause of the failure, the vehicle signal(s), the failure occurrence portion and the failure component name or the failure component code is displayed on the vehicle external display unit 15 owned by the repairman of the vehicle. With regard to the notification information, collective notification information, i.e. notification information including the time when the failure is predicted, the cause of the failure, the repair cost, the route(s) to the repair place(s), the candidate(s) for the repairable point(s), the repair reservation screen, the vehicle signal(s), the failure occurrence portion and the failure component name or the failure component code, may be notified to both of the manager and the repairman of the vehicle without dividing the notification information into information for the manager and information for the repairman. In addition, the collective notification information may be notified to one of the manager and the repairman of the vehicle, then the one of the manager and the repairman of the vehicle may present the collective notification information to the other of the manager and the repairman of the vehicle.

Figure 6:
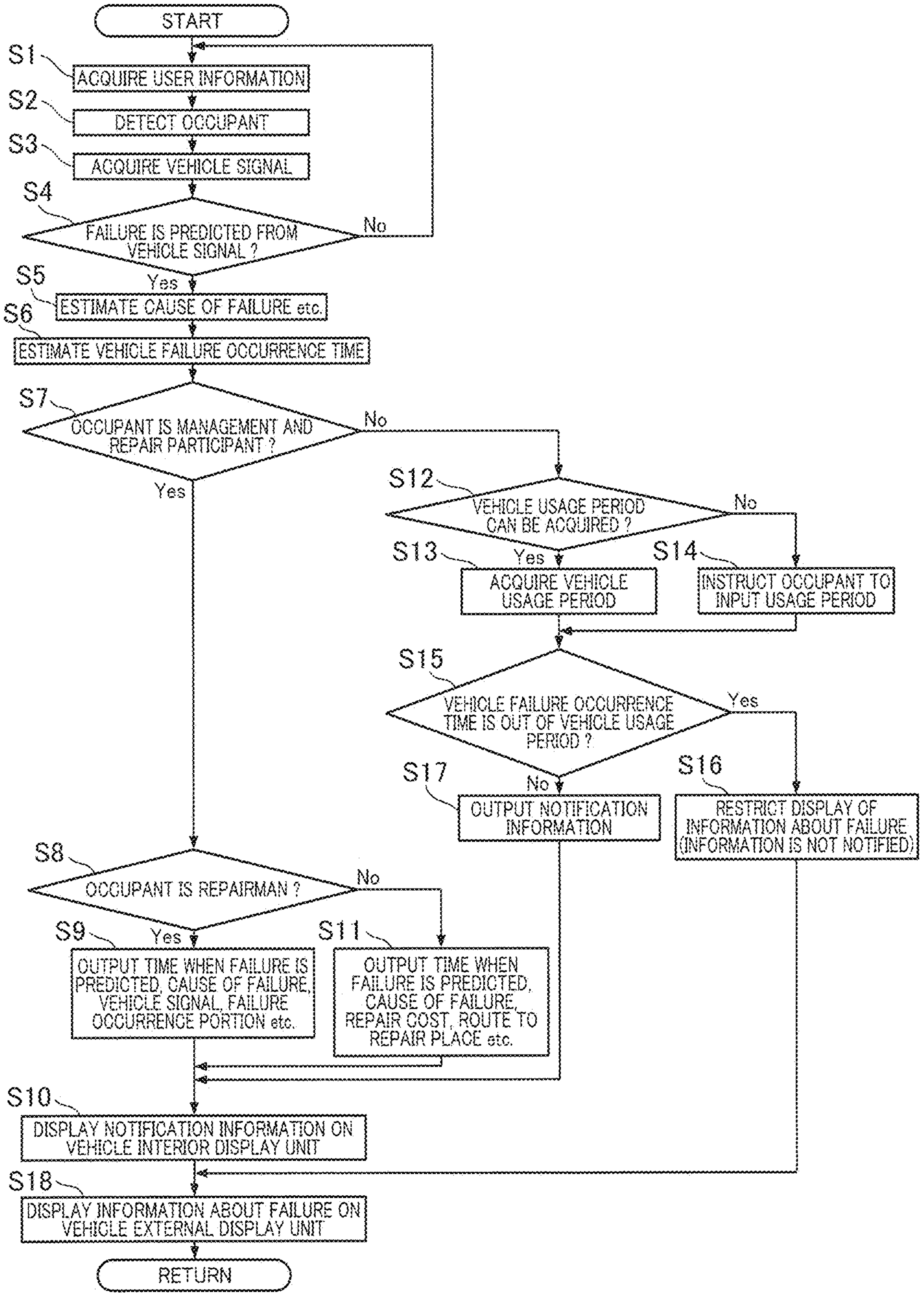
FIG. 6 is a flow chart showing a process flow according to the second embodiment.

FIG. 6 is a flow chart showing a flow of process of the failure prediction information output control device according to the second embodiment. The flow chart of the second embodiment is a flow chart in which step S18 is added as step following steps S10 and S16 of the flow chart (FIG. 4) of the first embodiment.

In the flow chart in FIG. 6, if it is judged that the predicted failure has already occurred at step S4, the routine proceeds to step S8 through steps S5 to S7. Then, it is judged that the occupant(s) is the repairman of the vehicle at step S8, the notification information including the time when the failure is predicted, the cause of the failure, the vehicle signal(s), the failure occurrence portion and the failure component name or the failure component code is output at step S9, and this notification information is displayed on the vehicle interior display unit 10 at step S10. With this, the repairman of the vehicle recognizes the notification information. When the routine proceeds to steps S8, S9 and S10 as described above, at step S18, the notification information including the time when the failure is predicted, the cause of the failure, the repair cost, the route(s) to the repair place(s), the candidate(s) for the repairable point(s) and the repair reservation screen is displayed on the vehicle external display unit 15 owned by the manager of the vehicle who is outside the vehicle. With this, the manager recognizes the notification information.

Further, it is judged that the occupant(s) is not the repairman, but the manager of the vehicle at step S8, the time when the failure is predicted, the cause of the failure, the repair cost, the route(s) to the repair place(s), the candidate(s) for the repairable point(s) and the repair reservation screen are output at step S11, and this notification information is displayed on the vehicle interior display unit 10 at step S10. With this, the manager of the vehicle recognizes the notification information. When the routine proceeds to steps S8, S11 and S10 as described above, at step S18, the notification information including the time when the failure is predicted, the cause of the failure, the vehicle signal(s), the failure occurrence portion and the failure component name or the failure component code is displayed on the vehicle external display unit 15 owned by the repairman of the vehicle who is outside the vehicle, e.g. at a repair shop (the repair place). With this, the repairman of the vehicle recognizes the notification information.

In the flow chart in FIG. 6, when the occupant is the user who is not the management and repair participant of the vehicle, at step S18 though steps S17 and S10 or through step S16, for instance, the notification information including the time when the failure is predicted, the cause of the failure, the vehicle signal(s), the failure occurrence portion and the failure component name or the failure component code is displayed on the vehicle external display unit 15 owned by the repairman of the vehicle who is outside the vehicle, also the notification information including the time when the failure is predicted, the cause of the failure, the repair cost, the route(s) to the repair place(s), the candidate(s) for the repairable point(s) and the repair reservation screen is displayed on the vehicle external display unit 15 owned by the manager of the vehicle who is outside the vehicle. With this, the manager and the repairman of the vehicle each recognize the notification information.

As described above, in the second embodiment, when the vehicle failure occurs, the notification information is displayed on the vehicle external display units 15 owned by the manager and the repairman of the vehicle. Therefore, the manager and the repairman of the vehicle who are outside the vehicle can recognize the notification information for dealing with the failure, and can deal with the failure.

Next, a third embodiment will be described with reference to FIGS. 7 to 9.

Figure 7:
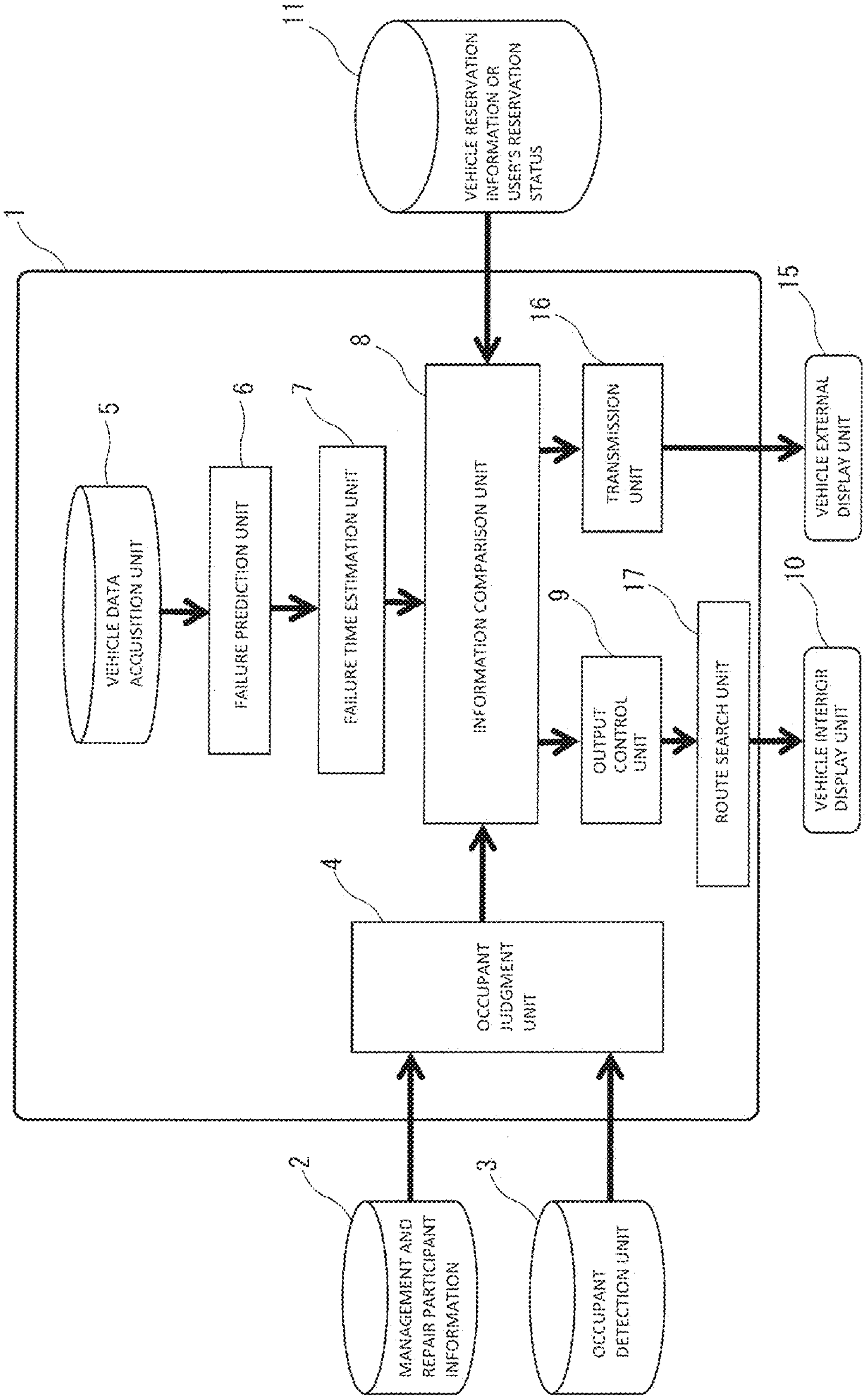
FIG. 7 is a functional block diagram of a failure prediction information output control device according to a third embodiment.
Figure 8:
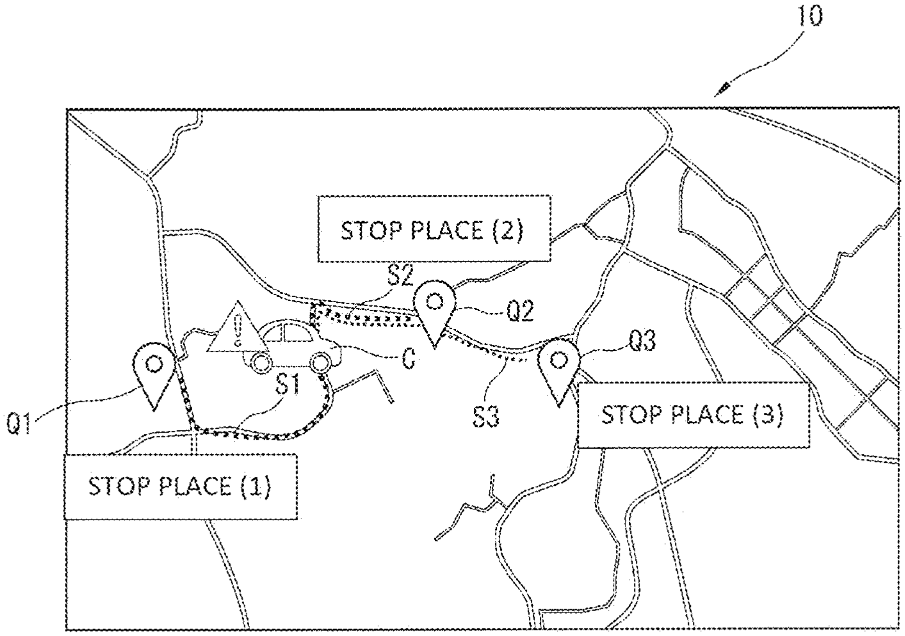
FIG. 8 is an explanatory drawing showing search information displayed on an in-vehicle display unit according to the third embodiment.

FIG. 7 is a functional block diagram of a failure prediction information output control device according to the third embodiment. In the third embodiment, in addition to the configuration of the failure prediction information output control device of the second embodiment, the failure prediction information output control device further has a route search unit 17 for performing route search. When it is judged that the occupant is the user who is not the management and repair participant of the vehicle by the occupant judgment unit 4 and also the failure occurrence time is within the vehicle usage period, the route search unit 17 searches one or a plurality of possible stop point (a stop place) (in the present embodiment, three possible stop points) which is relatively close to a current location, and displays a route(s) from the current location to the possible stop point(s) and a stop instruction on the vehicle interior display unit 10. "Possible stop point" is, for instance, a place such as a parking place (a parking lot) where the vehicle stops safely or a shoulder of a road having no legal problem except no-stopping-and-parking area. In an example shown in FIG. 8, search information searched in the third embodiment is displayed on the vehicle interior display unit 10. On this vehicle interior display unit 10, three possible stop points searched for a current location C of the vehicle, i.e. a first stop place Q1, a second stop place Q2 and a third stop place Q3, are shown. Further, the vehicle interior display unit 10 shows a route from the current location C to the first stop place Q1 as a "first route S1", a route from the current location C to the second stop place Q2 as a "second route S2" and a route from the current location C to the third stop place Q3 as a "third route S3". In the example shown in FIG. 8, since a stop place closest to the current location C is the second stop place Q2, by moving along the second route S2, the occupant can stop the vehicle early at the second stop place Q2.

Figure 9:
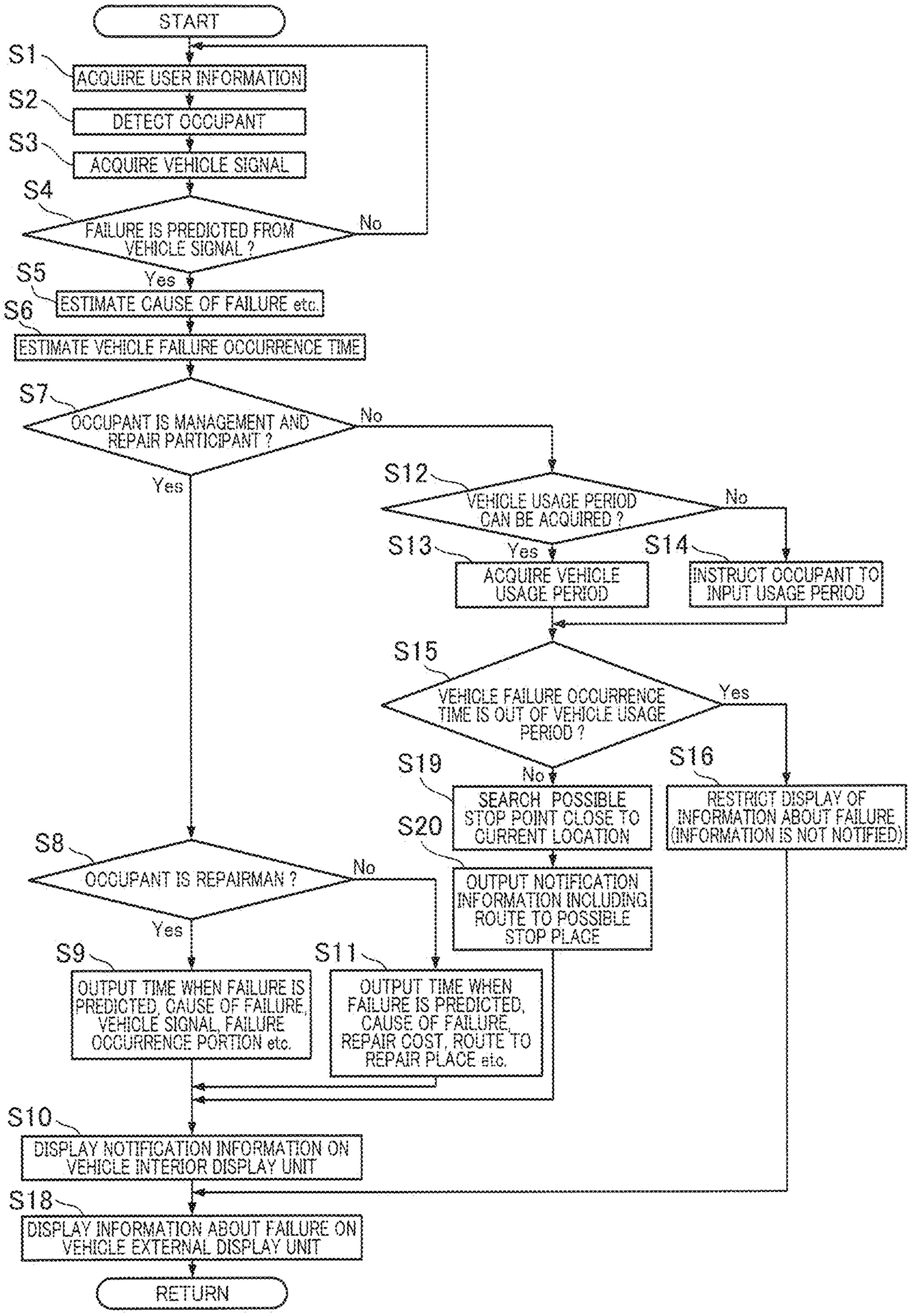
FIG. 9 is a flow chart showing a process flow according to the third embodiment.

FIG. 9 is a flow chart showing a flow of process of the failure prediction information output control device according to the third embodiment. The flow chart of the third embodiment is a flow chart in which step S17 of the flow chart (FIG. 4) of the first embodiment is eliminated, and new steps S19 and S20 are added between steps S15 and S10.

In the flow chart in FIG. 9, if it is judged that the vehicle failure occurrence time is not later than the vehicle usage period at step S15, since the vehicle failure occurrence time occurs within the vehicle usage period, at step S19, the stop places Q1, Q2 and Q3 which are the possible stop points relatively close to the current location C are searched. When performing this search, the routes S1, S2 and S3 from the current location C to the possible stop points are acquired. At step S20, notification information including information that the vehicle cannot reach a destination, a stop instruction and the first to third routes S1, S2 and S3 from the current location C to the possible stop places Q1, Q2 and Q3 is output. Then, at step S10, this notification information is displayed on the vehicle interior display unit 10.

As described above, in the third embodiment, when it is judged that the occupant is the user who is not the management and repair participant of the vehicle and also the vehicle failure occurrence time is within the vehicle usage period, the second stop place Q2 which is the possible stop point closest to the current location C is searched, and the second route S2 from the current location C to the second stop place Q2 and the stop instruction are output. That is, the second route S2 along which the vehicle should travel in order for the occupant to stop the vehicle most efficiently and the stop instruction are automatically output. Therefore, the occupant can immediately stop the vehicle at the second stop place Q2 by travelling along the second route S2 which is the shortest route at a time when the failure is predicted, and can, early, deal with the failure which may occur while ensuring safety of the occupant.

Next, a fourth embodiment will be described with reference to FIGS. 10 to 12.

Figure 10:
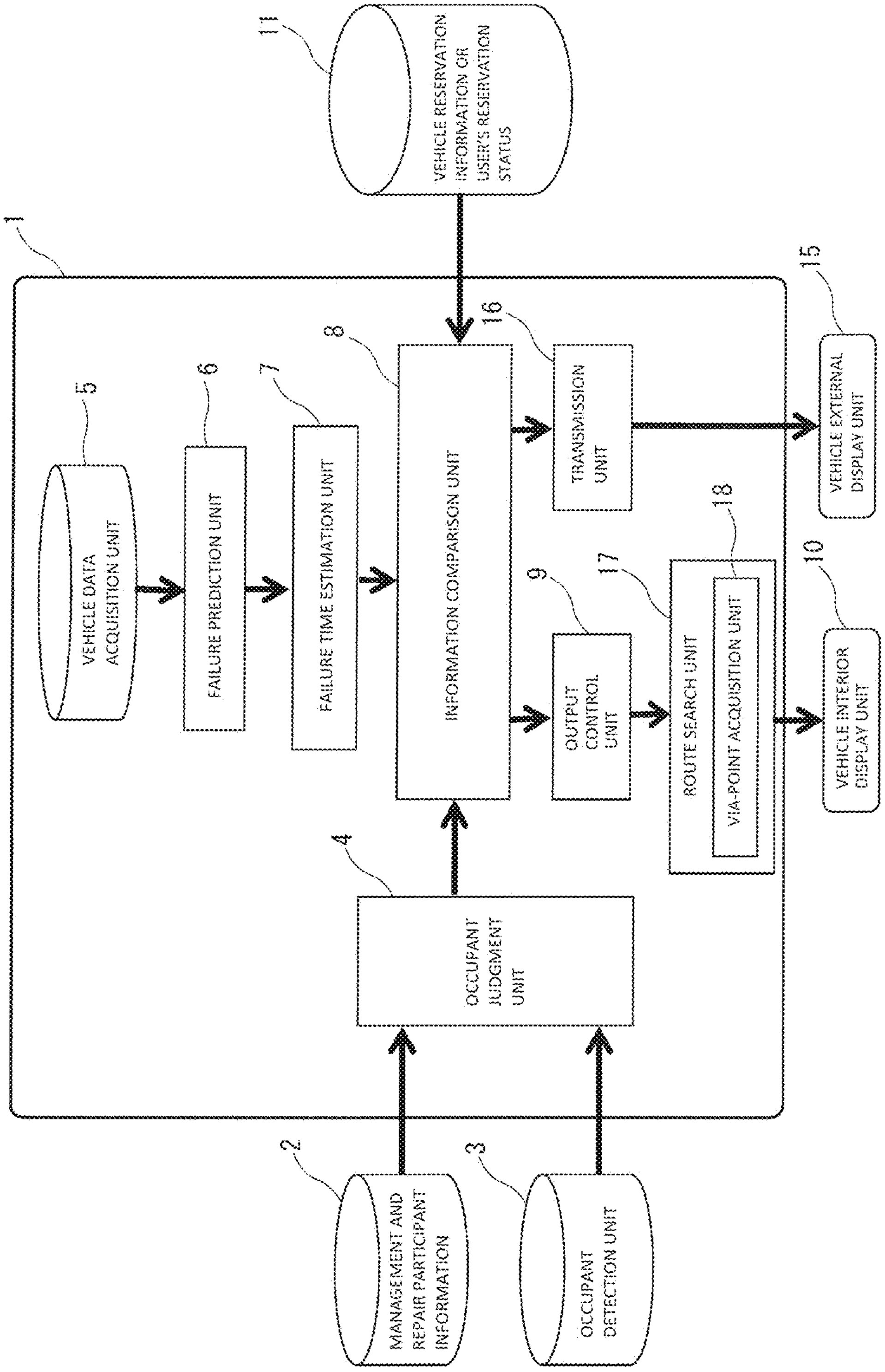
FIG. 10 is a functional block diagram of a failure prediction information output control device according to a fourth embodiment.

FIG. 10 is a functional block diagram of a failure prediction information output control device according to the fourth embodiment. In the fourth embodiment, in addition to the configuration of the failure prediction information output control device of the third embodiment, the failure prediction information output control device further has a via-point acquisition unit 18 that acquires a via-point(s) or a temporary getting-out point(s) until the occupant stops the vehicle. When it is judged that the occupant is the user who is not the management and repair participant of the vehicle by the occupant judgment unit 4 and also the failure occurrence time is within the vehicle usage period and further the via-point(s) or the temporary getting-out point(s) where the vehicle can stop before the occurrence of the vehicle failure is already input, the via-point acquisition unit 18 outputs a contact instruction to the management and repair participant of the vehicle when the occupant (the vehicle) arrives at the via-point(s) or the temporary getting-out point(s). "Via-point or temporary getting-out point" is, for instance, a point where the vehicle can reach on the way to a destination which is registered in the car navigation system and/or the external terminal, or a parking area on a highway etc. In a case where the vehicle usage period spans multiple days, a final destination on any day except the last day of the vehicle usage period can be regarded as the via-point or the temporary getting-out point. For instance, if the vehicle usage period is two days, a final destination (a hotel, other accommodation, etc.) on a first day can be regarded as the via-point or the temporary getting-out point.

Figure 11:
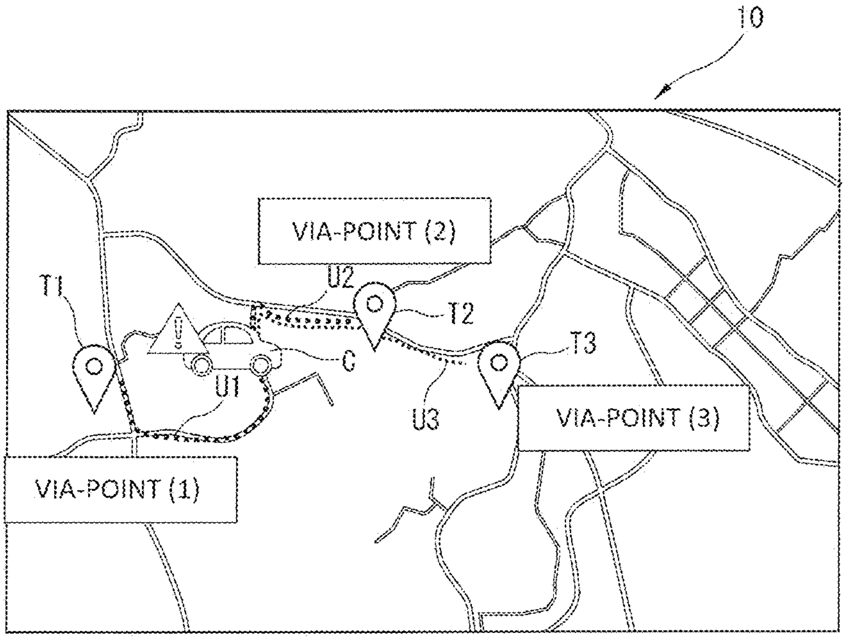
FIG. 11 is an explanatory drawing showing acquisition information displayed on the in-vehicle display unit according to the fourth embodiment.

In an example shown in FIG. 11, acquisition information acquired in the fourth embodiment is displayed on the vehicle interior display unit 10. On this vehicle interior display unit 10, first to third via-points (via-points where the vehicle can stop) T1, T2 and T3 acquired for a current location C are shown. Further, the vehicle interior display unit 10 shows, in addition to the first to third via-points T1, T2 and T3, first to third routes U1, U2 and U3 from the current location C to the first to third via-points T1, T2 and T3. In the example shown in FIG. 11, since a stop place closest to the current location C is the second via-point T2, by moving along the second route U2, the occupant can stop the vehicle early at the second via-point T2.

Figure 12:
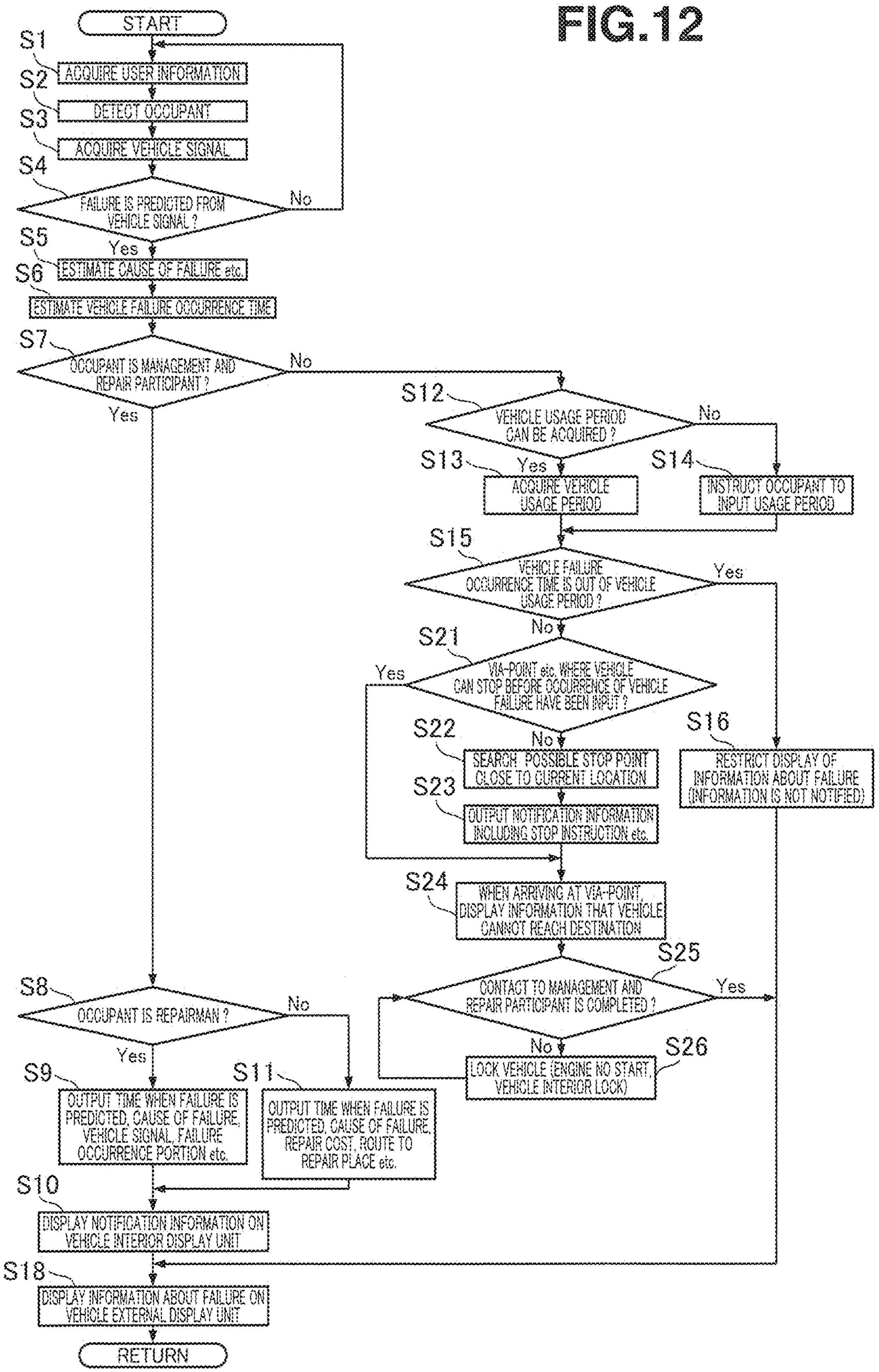
FIG. 12 is a flow chart showing a process flow according to the fourth embodiment.

FIG. 12 is a flow chart showing a flow of process of the failure prediction information output control device according to the fourth embodiment. The flow chart of the fourth embodiment is a flow chart in which steps S19 and S20 of the flow chart (FIG. 9) of the third embodiment are eliminated, and new steps S21 to S26 are added between steps S15 and S18.

In the flow chart in FIG. 12, if it is judged that the vehicle failure occurrence time is not later than the vehicle usage period at step S15, since the vehicle failure occurrence time occurs within the vehicle usage period, at step S21, a judgment is made as to whether or not the via-point(s) or the temporary getting-out point(s) where the vehicle can stop before the occurrence of the vehicle failure has already been input. If the via-point(s) or the temporary getting-out point(s) where the vehicle can stop has already been input, at step S24, notification information including information that the vehicle cannot reach a destination, the instruction to contact the management and repair participant and contact information (phone number) of the management and repair participant is displayed on the vehicle interior display unit 10 when the occupant (the vehicle) arrives at the via-point(s) or the temporary getting-out point(s).

If the via-point(s) or the temporary getting-out point(s) where the vehicle can stop before the occurrence of the vehicle failure has not been input yet at step S21, at step S22, the first to third via-points T1, T2 and T3 which are the possible stop points relatively close to the current location Care searched. When performing this search, the routes U1, U2 and U3 from the current location C to the possible stop points are acquired. At step S23, notification information including a stop instruction and the route(s) to the possible stop point(s) is output. Next, at step S24, the notification information including information that the vehicle cannot reach a destination, the instruction to contact the management and repair participant and the contact information (the phone number) of the management and repair participant is displayed on the vehicle interior display unit 10 when the occupant (the vehicle) arrives at the via-point(s) or the temporary getting-out point(s). Then, at step S25, a judgment is made as to whether or not the contact to the management and repair participant of the vehicle is completed. If the contact to the management and repair participant of the vehicle is completed, at step S18, for instance, the notification information including the time when the failure is predicted, the cause of the failure, the repair cost, the route(s) to the repair place(s), the candidate(s) for the repairable point(s) and the repair reservation screen is displayed on the vehicle external display unit 15 owned by the manager of the vehicle, and also the notification information including the time when the failure is predicted, the cause of the failure, the vehicle signal(s), the failure occurrence portion and the failure component name or the failure component code is displayed on the vehicle external display unit 15 owned by the repairman of the vehicle.

If the contact to the management and repair participant of the vehicle is not completed at step S25, at step S26, the vehicle is locked. "Vehicle is locked" means, for instance, to perform control so that an engine does not start or to lock a vehicle interior until the contact to the management and repair participant of the vehicle is completed, then to prevent the vehicle from moving or being left by the occupant. Here, means or method for preventing the vehicle from moving or being left is not limited to the above engine control etc.

As described above, in the fourth embodiment, when it is judged that the occupant is the user who is not the management and repair participant of the vehicle by the occupant judgment unit 4 and also the failure occurrence time is within the vehicle usage period and further the via-point(s) or the temporary getting-out point(s) where the vehicle can stop before the occurrence of the vehicle failure is already input, the contact instruction to the management and repair participant of the vehicle is output when the occupant (the vehicle) arrives at the via-point(s) or the temporary getting-out point(s). Therefore, unnecessary vehicle stop can be reduced. Further, since the via-point or the temporary getting-out point is generally close to the current location as compared with the possible stop point (the stop place) mentioned in the third embodiment, travel time of the occupant can be shortened, and loss of time of the occupant can be reduced. Further, the occupant can implement a part of occupant's plan by using time generated by reduction in the loss of time, thereby effectively utilizing time. In addition, since the occupant can contact the management and repair participant of the vehicle after the vehicle stops, the management and repair participant of the vehicle can, early, deal with the failure which may occur while ensuring safety of the occupant.

Further, in the present embodiment, when the vehicle arrives at the via-point or the temporary getting-out point, the vehicle is locked until the contact to the management and repair participant of the vehicle is completed. With this, the occupant surely contacts the management and repair participant of the vehicle about the failure. Therefore, the management and repair participant of the vehicle can grasp a current state of the vehicle and deal with the failure which may occur.

Next, a fifth embodiment will be described with reference to FIGS. 13 and 14.

Figure 13:
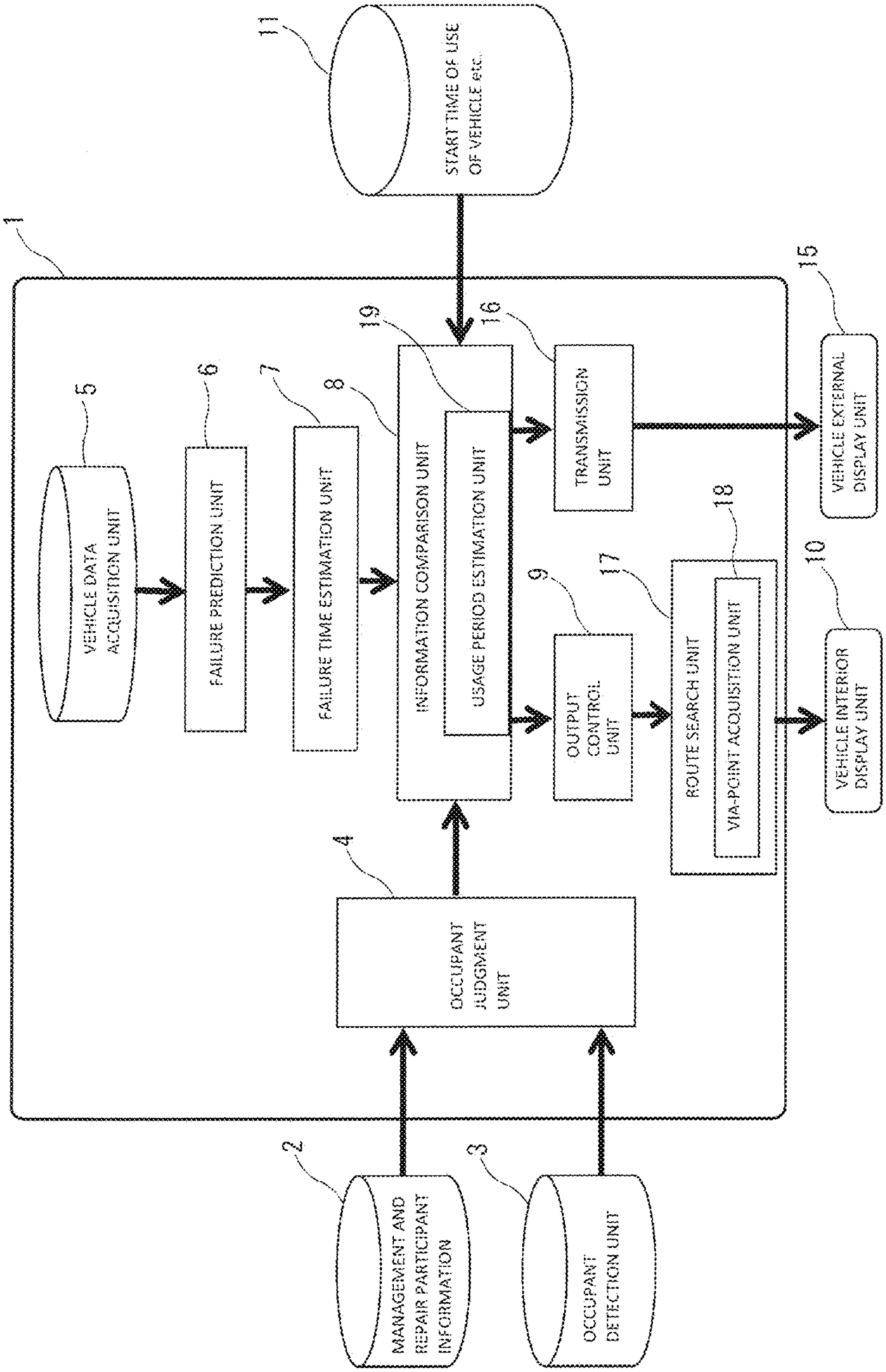
FIG. 13 is a functional block diagram of a failure prediction information output control device according to a fifth embodiment.

FIG. 13 is a functional block diagram of a failure prediction information output control device according to the fifth embodiment. In the fifth embodiment, the management and repair participant of the vehicle is a manager or an employee of a leasing company that rents out vehicles to a company, and the user who is not the management and repair participant of the vehicle is an employee of a company that has contracted with the leasing company. It is noted that the fifth embodiment can also be applied to a case where the management and repair participant of the vehicle is a friend and the user who is not the management and repair participant of the vehicle is a person who borrows friend's vehicle, or the management and repair participant of the vehicle is a parent and the user who is not the management and repair participant of the vehicle is parent's child. In the fifth embodiment, in addition to the configuration of the failure prediction information output control device of the fourth embodiment, the failure prediction information output control device further has a usage period estimation unit 19 that estimates the vehicle usage period when the vehicle usage period cannot be automatically acquired. The usage period estimation unit 19 is provided in the information comparison unit 8. When it is judged that the occupant is the user who is not the management and repair participant of the vehicle by the occupant judgment unit 4 and also the vehicle usage period is unknown, the usage period estimation unit 19 acquires information from the external terminal (the terminal outside the vehicle) 11, and estimates the vehicle usage period based on this information. When performing the estimation, instead of using the information acquired from the external terminal, the usage period estimation unit 19 may use information acquired from a vehicle interior terminal. The information acquired from the external terminal is, for instance, a time when the employee of the company starts to use the vehicle and a time (or a time period) when (or for which) the management and repair participant of the vehicle needs to use the vehicle for putting the vehicle in a garage. The time when the employee of the company starts to use the vehicle may be determined in consideration of a period from a time when the employee leaves home for work to a time when the employee arrives at the company. The estimation of the vehicle usage period is performed by regarding a period from the time when the employee of the company starts to use the vehicle to, for instance, the time when the management and repair participant of the vehicle starts to put the vehicle in the garage as the vehicle usage period. For instance, in a case where the time when the employee of the company starts to use the vehicle is 13:30 and the time when the management and repair participant of the vehicle needs to start to put the vehicle in the garage is 20:30 on the same day, a period from 13:30 to 20:30 is estimated as the vehicle usage period. Further, the estimation of the vehicle usage period may be performed by regarding a period from a time when it is judged that the occupant is the user who is not the management and repair participant of the vehicle by the occupant judgment unit 4 to the time when the management and repair participant of the vehicle starts to use the vehicle as the vehicle usage period.

Figure 14:
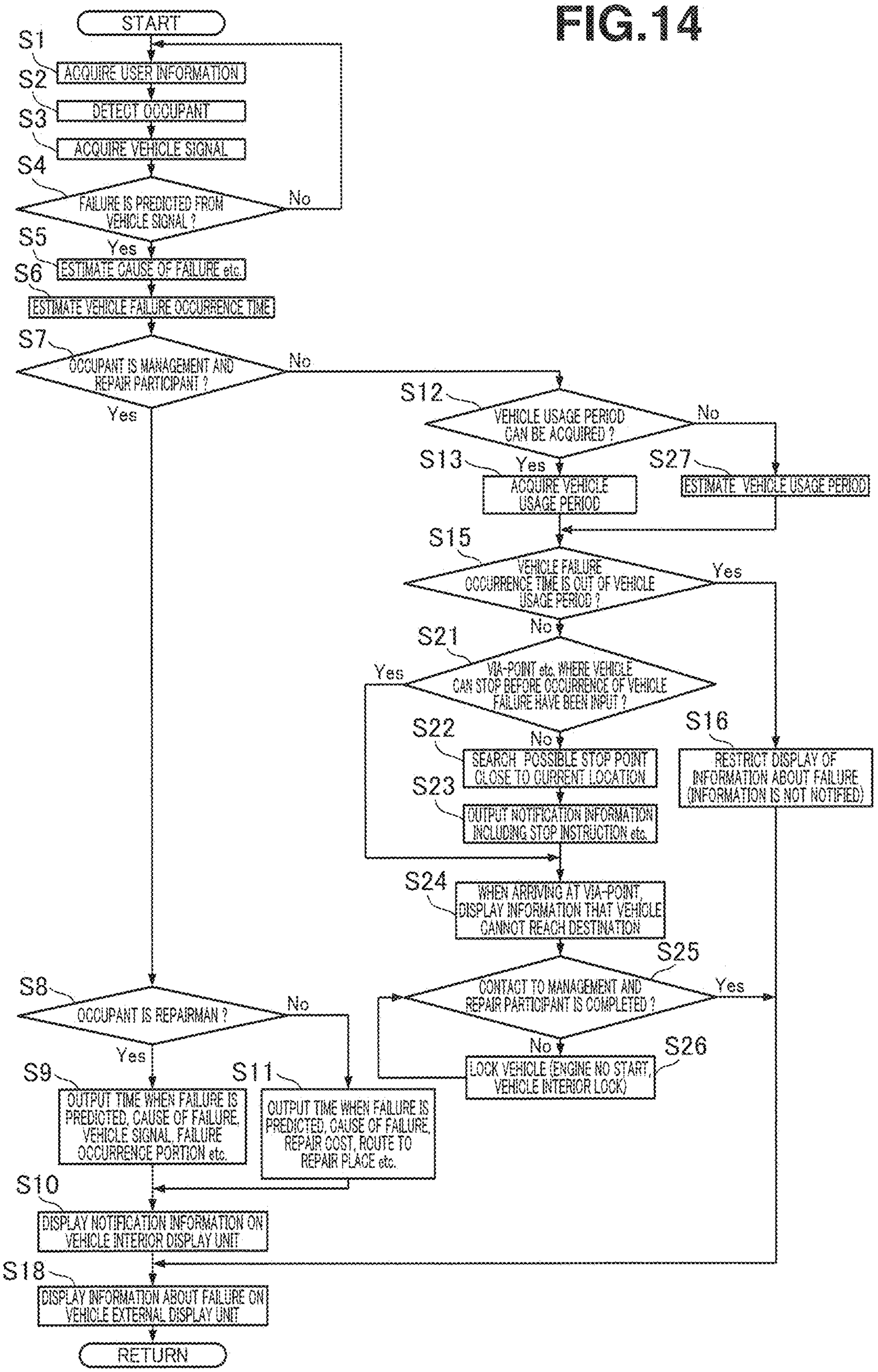
FIG. 14 is a flow chart showing a process flow according to the fifth embodiment.

FIG. 14 is a flow chart showing a flow of process of the failure prediction information output control device according to the fifth embodiment. The flow chart of the fifth embodiment is a flow chart in which step S14 of the flow chart (FIG. 12) of the fourth embodiment is replaced with new step S27.

In the flow chart in FIG. 14, if it is judged that the usage period of the vehicle cannot be acquired at step S12, at step S27, the vehicle usage period is estimated. This estimation is performed by regarding, for instance, the information acquired from the external terminal 11, i.e. the period between the time when the employee of the company starts to use the vehicle and the time when the management and repair participant of the vehicle starts to put the vehicle in the garage, as the vehicle usage period.

As described above, in the fifth embodiment, when it is judged that the occupant is the user who is not the management and repair participant of the vehicle by the occupant judgment unit 4 and also the vehicle usage period is unknown, the information is acquired from the external terminal 11, and the vehicle usage period is estimated based on this information. Therefore, the employee using the shared vehicle used by lease contract of the company can save himself/herself from having to input the vehicle usage period.

Next, a sixth embodiment will be described with reference to FIGS. 15 and 16.

Figure 15:
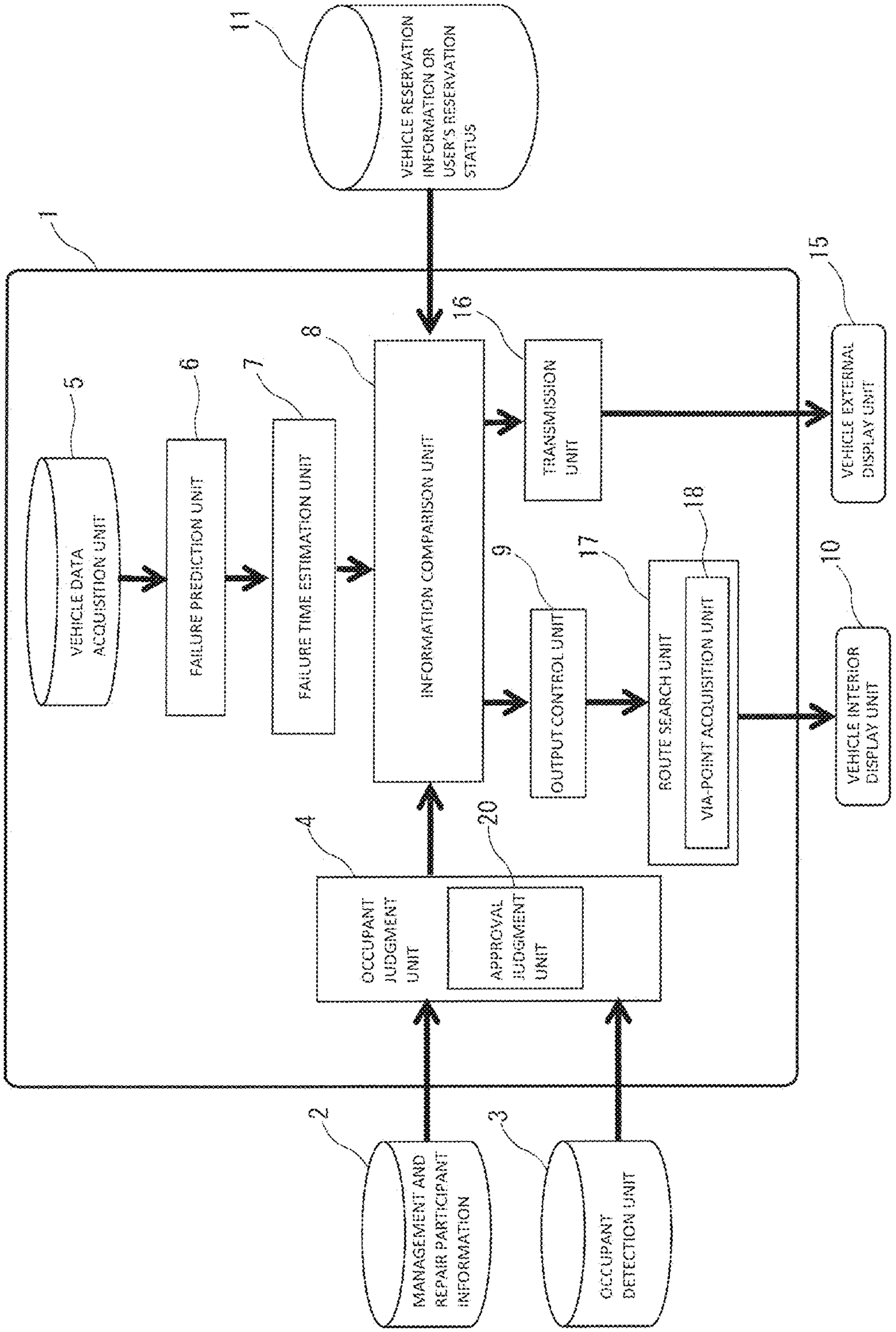
FIG. 15 is a functional block diagram of a failure prediction information output control device according to a sixth embodiment.

FIG. 15 is a functional block diagram of a failure prediction information output control device according to the sixth embodiment. In the sixth embodiment, the usage period estimation unit 19 of the failure prediction information output control device of the fifth embodiment is eliminated, and an approval judgment unit 20 is added to the occupant judgment unit 4 of the failure prediction information output control device of the sixth embodiment. When it is judged that the occupant is the user who is not the management and repair participant of the vehicle by the occupant judgment unit 4 and also the vehicle usage period is unknown, the approval judgment unit 20 notifies the manager of the vehicle that someone other than the user who is not the management and repair participant of the vehicle rides in the vehicle, and displays a screen for selecting whether to approve this occupant as a service user. "Someone other than the user who is not the management and repair participant of the vehicle" is, for instance, a person who has not reserved the vehicle at the rental car company (a person other than the rental car service user), an unauthorized user of the rental car, or a person who has entered the vehicle with intent to commit theft. The approval judgment unit 20 outputs an instruction to get out of the vehicle on the screen for selecting whether to approve the occupant as the service user when the occupant is not approved as the service user by the manager of the vehicle, and performs an emergency stop.

Figure 16:
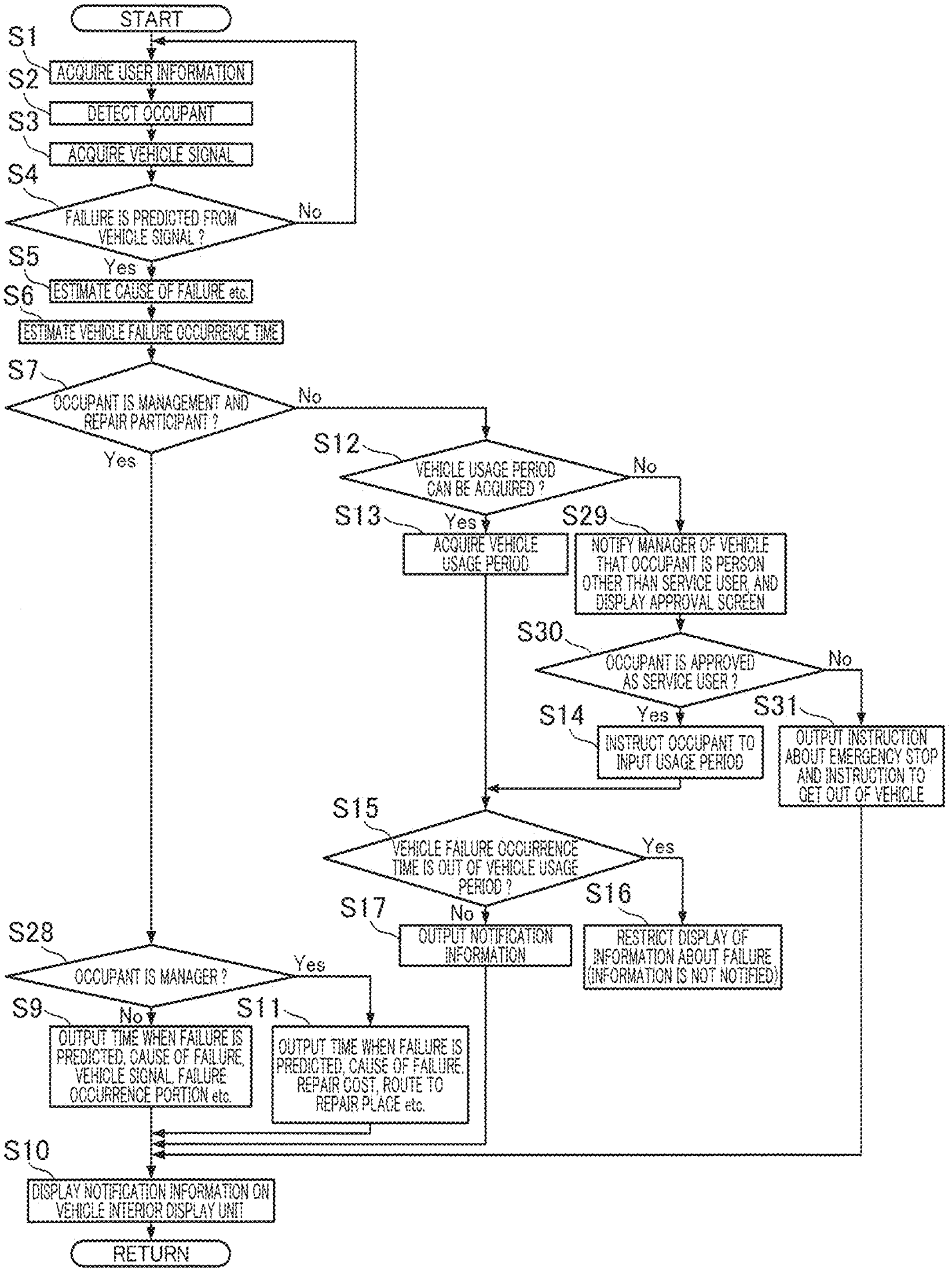
FIG. 16 is a flow chart showing a process flow according to the sixth embodiment.

FIG. 16 is a flow chart showing a flow of process of the failure prediction information output control device according to the sixth embodiment. The flow chart of the sixth embodiment is a flow chart in which step S8 of the flow chart (FIG. 4) of the first embodiment is replaced with new step S28, and new steps S29 to S31 are added between steps S12 and S10.

In the flow chart in FIG. 16, if it is judged that the occupant is a manager of the vehicle at step S28, at step S11, the time when the failure is predicted, the cause of the failure, the repair cost, a route(s) to a repair place(s), a candidate(s) for a repairable point(s) and a repair reservation screen are output as notification information. Then, at step S10, this notification information is displayed on the vehicle interior display unit 10.

If it is judged that the occupant is not the manager of the vehicle at step S28, the occupant is judged to be a repairman, and step S9, the time when the failure is predicted, the cause of the failure, the vehicle signal(s), the failure occurrence portion and the failure component name or the failure component code are output as notification information. Then, at step S10, this notification information is displayed on the vehicle interior display unit 10.

If it is judged that the usage period of the vehicle cannot be acquired at step S12, at step S29, the information that someone other than the user (the service user) who is not the management and repair participant of the vehicle is riding in the vehicle is notified to the manager of the vehicle, and the screen for selecting whether to approve this occupant as the service user is displayed. Then, at step S30, when the manager of the vehicle approves the occupant as an authorized service user, at step S14, the input instruction of the vehicle usage period is output. If the manager of the vehicle judges that the occupant is an unauthorized service user at step S30, at step S31, the instruction about the emergency stop and the instruction to get out of the vehicle are output. Then, at step 10, these instructions are displayed on the vehicle interior display unit 10.

As described above, in the sixth embodiment, when it is judged that the occupant is the user who is not the management and repair participant of the vehicle by the occupant judgment unit 4 and also the vehicle usage period is unknown, the information that someone other than the user who is not the management and repair participant of the vehicle is riding in the vehicle is notified to the manager of the vehicle, and the screen for selecting whether to approve this occupant as the service user is displayed. Therefore, when the occupant is recognized as a person other than the authorized user, the manager of the vehicle can know whether or not theft of the vehicle (steal of the vehicle) or unauthorized use has occurred. Further, if the steal of the vehicle or the unauthorized use occurs, the manager of the vehicle can properly deal with the steal of the vehicle, and can prevent a failure of the vehicle which is caused by the steal of the vehicle or vehicle-riding-around by the unauthorized user.

In addition, in the present embodiment, if the manager of the vehicle refuses to approve the occupant as the service user on the screen for selecting whether to approve the occupant as the service user, the instruction to get out of the vehicle is output, and the emergency stop is performed. Therefore, it is possible to immediately stop the steal of the vehicle or vehicle use by the unauthorized user.

Next, a seventh embodiment will be described with reference to FIGS. 17 and 18.

Figure 17:
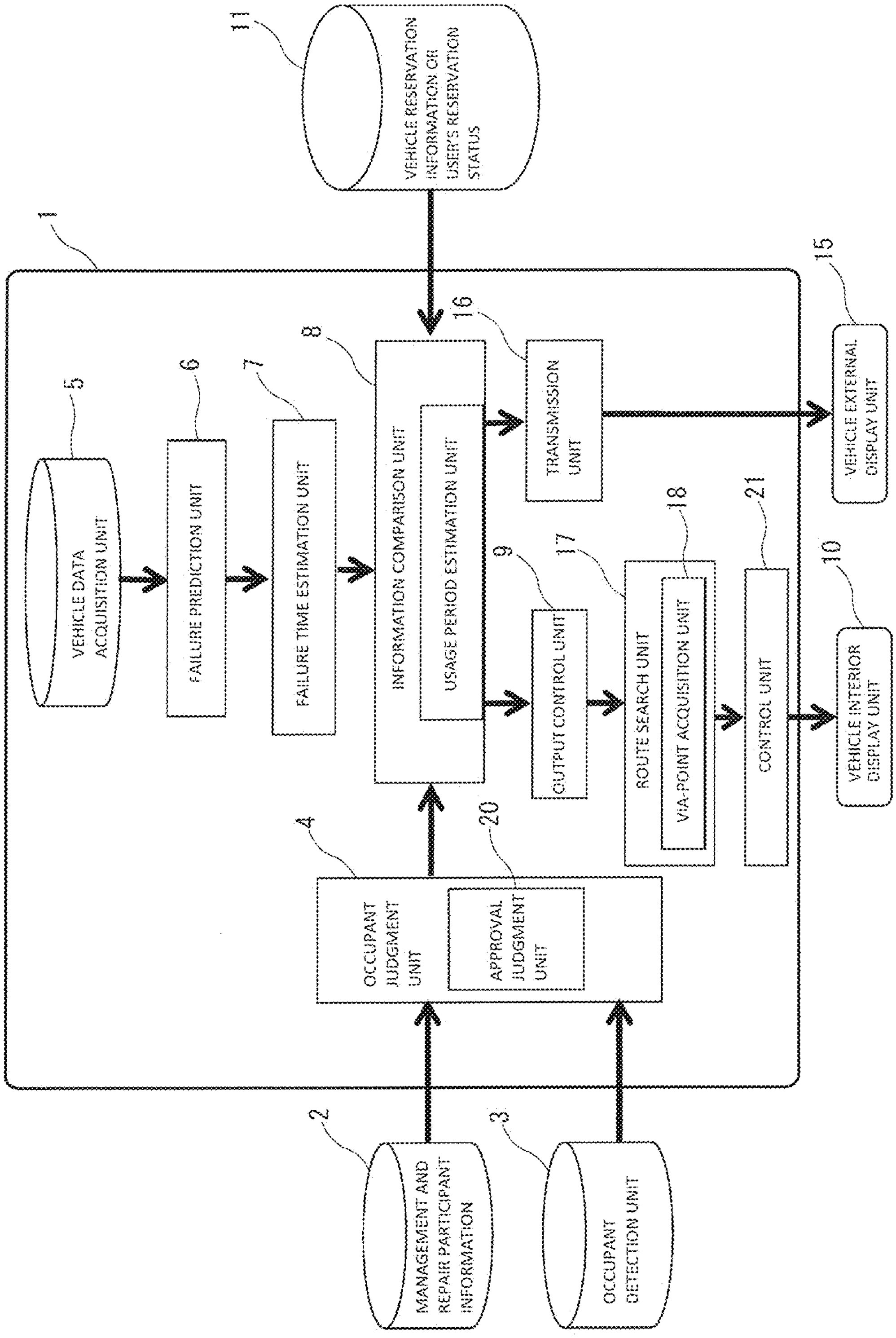
FIG. 17 is a functional block diagram of a failure prediction information output control device according to a seventh embodiment.

FIG. 17 is a functional block diagram of a failure prediction information output control device according to the seventh embodiment. In the seventh embodiment, a control unit 21 is added to the failure prediction information output control device of the fifth embodiment. When it is judged that the occupant is the user who is not the management and repair participant of the vehicle by the occupant judgment unit 4 and also the vehicle failure occurrence time is later than the vehicle usage period, the control unit 21 displays a screen for selecting whether to approve a vehicle travel continuation permission and a vehicle usage period extension on the vehicle external display unit 15 of the manager of the vehicle, and notifies content of refusal only when at least one of these permission and extension is refused. A case where the vehicle travel continuation permission or the vehicle usage period extension is refused is e.g. a case where the management and repair participant of the vehicle judges that voluntary restriction of the provision of service is necessary in consideration of factors such as unusual noise or vibration which do not cause failure of a vehicle component within the vehicle usage period, but may reduce quality of the service and reputation of the vehicle. When the vehicle travel continuation permission is refused, the control unit 21 presents an alternative vehicle or candidates for transportation means such as taxi and train to the manager of the vehicle. Further, when the vehicle travel continuation permission is refused, the route search unit 17 searches a possible stop point which is closest to the current location, and the instruction to get out of the vehicle is output, then the emergency stop is performed. In addition, when the vehicle usage period extension is refused, the control unit 21 controls a display on an operation screen so that the vehicle usage period extension cannot be extended.

Figure 18:
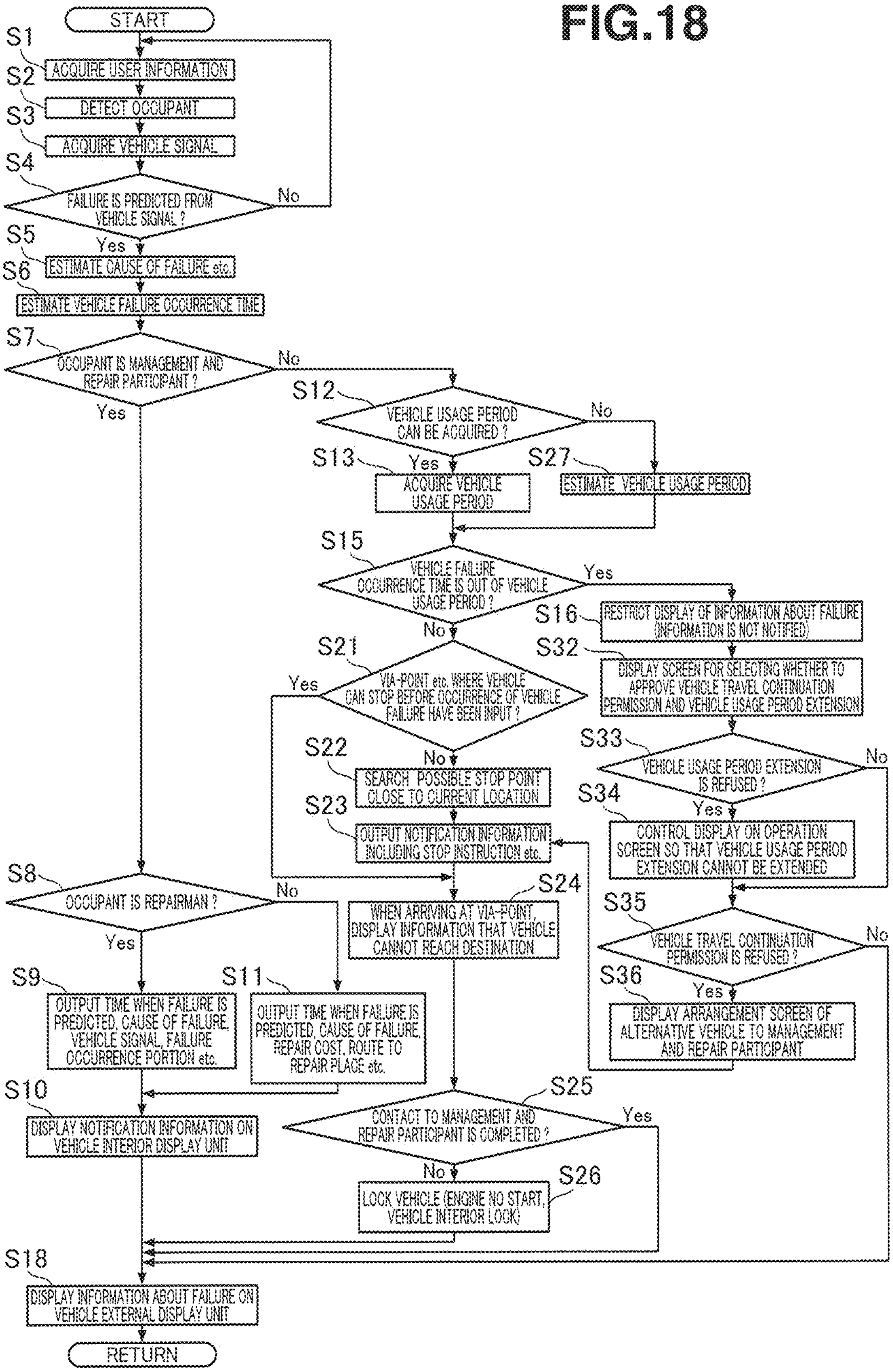
FIG. 18 is a flow chart showing a process flow according to the seventh embodiment.

FIG. 18 is a flow chart showing a flow of process of the failure prediction information output control device according to the seventh embodiment. The flow chart of the seventh embodiment is a flow chart in which new steps S32 to S35 are added between steps S16 and S18 of the flow chart (FIG. 14) of the fifth embodiment.

In the flow chart in FIG. 18, it is judged that the occupant(s) is a user who is not the management and repair participant at step S7, and it is judged that the usage period of the vehicle can be acquired at step S12. Then, for instance, at step S13, the usage period of the vehicle is acquired, and at step S15, a judgment is made as to whether or not the vehicle failure occurrence time is out of the vehicle usage period. That is, the information comparison unit 8 judges whether or not the vehicle failure occurrence time is later than the vehicle usage period. If it is judged that the vehicle failure occurrence time is later than the vehicle usage period at step S15, at step S16, display of the information about the failure on the vehicle interior display unit 10 is restricted.

Next, at step S32, the screen for selecting whether to approve the vehicle travel continuation permission and the vehicle usage period extension is displayed on the vehicle external display unit 15 of the manager of the vehicle. Subsequently, at step S33, a judgment is made as to whether or not the vehicle usage period extension is refused. If the vehicle usage period extension is refused, at step S34, the display on the operation screen is controlled so that the vehicle usage period extension cannot be extended. Next, at step S35, a judgment is made as to whether or not the vehicle travel continuation permission is refused. If the vehicle travel continuation permission is refused, at step S36, an arrangement screen including the alternative vehicle or the candidates for transportation means is displayed on the vehicle external display unit 15 of the manager of the vehicle. After displaying the arrangement screen at step S36, the routine proceeds to step S23, and the notification information including the stop instruction and the route(s) to the possible stop point(s) is output. If the vehicle travel continuation permission is approved at step S35, information including content of the refusal at step S33 is notified, and the routine proceeds to step S18. As described above, this output of the information is based on the fact that only when at least one of the vehicle travel continuation permission and the vehicle usage period extension is refused, the content of the refusal is notified, and the vehicle usage period extension has already been refused at step S33.

If the vehicle usage period extension is permitted at step S33, the routine proceeds to step S35, and a judgment is made as to whether or not the vehicle travel continuation permission is refused.

As described above, in the seventh embodiment, when it is judged that the occupant is the user who is not the management and repair participant of the vehicle by the occupant judgment unit 4 and also the vehicle failure occurrence time is later than the vehicle usage period, the screen for selecting whether to approve the vehicle travel continuation permission and the vehicle usage period extension is displayed on the vehicle external display unit 15 of the manager of the vehicle, and the content of the refusal is notified only when at least one of these permission and extension is refused. Therefore, the manager of the vehicle can prevent risk of occurrence of the failure before they happen by stopping continuation or extension of the service according to manager's convenience when there are factors which do not cause occurrence of the failure, but may reduce quality of the service and reputation of the vehicle.

Further, in the seventh embodiment, when the vehicle travel continuation permission is refused, the alternative vehicle or the candidates for transportation means are presented to the manager of the vehicle. Therefore, the manager of the vehicle can quickly consider or arrange the alternative vehicle for the user.

In addition, in the seventh embodiment, when the vehicle travel continuation permission is refused, the possible stop point which is closest to the current location is searched, and the instruction to get out of the vehicle is output, then the emergency stop is performed. Therefore, even when stopping the continuation or the extension of the service according to manager's convenience, it is possible to quickly stop the vehicle and suppress the risk of occurrence of the failure to the minimum.

Moreover, in the seventh embodiment, when the vehicle usage period extension is refused, the display on the operation screen is controlled so that the vehicle usage period extension cannot be extended. Therefore, when the user cannot extend the vehicle usage period, it is possible to prevent the user from mistakenly applying for the extension.

Next, an eighth embodiment will be described.

In the eighth embodiment, when it is judged that the occupant is the user who is not the management and repair participant of the vehicle and also the vehicle failure occurrence time is within the vehicle usage period and further the cause of the failure is malfunction that will not meet performance requirements set forth in the safety standard, a screen for selecting whether to approve the vehicle travel continuation permission and the vehicle usage period extension is displayed to the manager involved in management of the vehicle as the management and repair participant of the vehicle, and the content of the refusal is notified to the manager only when at least one of these permission and extension is refused. The above malfunction is, for instance, an occurrence of failure of the component which relates to travel or stop of the vehicle, such as failure of the engine or damage to a brake pad, which will not meet the performance requirements set forth in the safety standard of traffic laws and which is in a condition in which the vehicle should not continue travelling. In such a case, by displaying the screen for selecting whether to approve the vehicle travel continuation permission and the vehicle usage period extension to the manager, the manager can grasp the failure of the vehicle component, and can ensure safety of the user.

In the above embodiments, examples in which the user who is not the management and repair participant of the vehicle drives the vehicle are described. However, the user who is not the management and repair participant of the vehicle is not limited to a person who drives the vehicle. The user might also be a user using connected service or in-vehicle Wi-Fi service.

In the above embodiments, examples in which the repairman is detected among the management and repair participant of the vehicle are described. However, as the occupant to be detected, a person from a vehicle development department (a person in charge of vehicle analysis) may be added.

The invention claimed is:

1. A failure prediction information output control method comprising:

predicting, by a computer system, a failure of a vehicle based on a vehicle signal that indicates characteristics of the vehicle;

estimating, by the computer system, a time when the failure of the vehicle occurs based on the predicted failure;

acquiring, by the computer system, identification information of a management and repair participant of the vehicle who has an authority or an obligation to request for repair for the failure of the vehicle and is involved in the repair by receiving the request;

detecting, by the computer system, identification information of an occupant of the vehicle;

comparing, by the computer system, the detected identification information of the occupant and the acquired identification information of the management and repair participant of the vehicle;

judging, by the computer system, that the time when the failure of the vehicle occurs is a case where the occupant is a user who is not the management and repair participant of the vehicle;

notifying a manager involved in management of the vehicle that the occupant is a user who is not the management and repair participant;

outputting an instruction for the occupant to get out of the vehicle via a vehicle interior display unit; and performing an emergency stop of the vehicle.

2. The failure prediction information output control method as claimed in claim 1, further comprising:

when it is judged that the time when the failure of the vehicle occurs at a time when the failure of the vehicle is predicted is within the vehicle usage period, outputting notification information about the predicted failure to the occupant via the vehicle interior display unit.

3. The failure prediction information output control method as claimed in claim 1, further comprising:

displaying information including at least one of a time when the failure is predicted, a cause of the failure, a vehicle signal, a failure occurrence portion and a failure component name or a failure component code to a vehicle external display unit.

4. The failure prediction information output control method as claimed in claim 1, further comprising:

displaying information including at least one of a time when the failure is predicted, a cause of the failure, a repair cost, a route to a repair place, a candidate for a repairable point and a repair reservation screen to a vehicle external display unit.

5. The failure prediction information output control method as claimed in claim 1, further comprising:

when it is judged that the time when the failure of the vehicle occurs is within the vehicle usage period, outputting information that the vehicle cannot reach a destination to the vehicle interior display unit.

6. The failure prediction information output control method as claimed in claim 1, further comprising:

when it is judged that the vehicle usage period is unknown, acquiring the vehicle usage period by asking the occupant to input the vehicle usage period.

7. The failure prediction information output control method as claimed in claim 1, further comprising:

when it is judged that the vehicle usage period is unknown, acquiring information from an external terminal or a vehicle interior terminal, and estimating the vehicle usage period.

8. The failure prediction information output control method as claimed in claim 1, further comprising:

displaying a screen for selecting whether to approve the occupant as a service user.

9. The failure prediction information output control method as claimed in claim 1, further comprising:

when the failure of the vehicle component occurs, displaying information including at least one of a time when the failure is predicted, a cause of the failure, a repair cost, a route to a repair place, a candidate for a repairable point, a repair reservation screen, a vehicle signal, a failure occurrence portion and a failure component name or a failure component code on a vehicle external display unit.

10. The failure prediction information output control method as claimed in claim 1, further comprising:

when it is judged that the time when the failure of the vehicle occurs is within the vehicle usage period, searching a possible stop point closest to a current location, and outputting a route from the current location to the possible stop point and an emergency stop instruction.

11. The failure prediction information output control method as claimed in claim 10, further comprising:

controlling the vehicle so the occupant cannot get out of the vehicle until the vehicle arrives at the possible stop point closest to the current location.

12. The failure prediction information output control method as claimed in claim 1, further comprising:

when it is judged that the time when the failure of the vehicle occurs is later than the vehicle usage period, displaying a screen for selecting whether to approve a vehicle travel continuation permission and a vehicle usage period extension to the manager, and notifying content of refusal only when at least one of these permission and extension is refused.

13. The failure prediction information output control method as claimed in claim 12, further comprising:

presenting an alternative vehicle or a candidate for transportation means.

14. The failure prediction information output control method as claimed in claim 12, further comprising:

when the vehicle usage period extension is refused, controlling a display on an operation screen so that the vehicle usage period extension cannot be extended.

15. The failure prediction information output control method as claimed in claim 1, further comprising:

when it is judged that the time when the failure of the vehicle occurs is within the vehicle usage period and further a cause of the failure is malfunction that will not meet performance requirements set forth in a safety standard, displaying a screen for selecting whether to approve a vehicle travel continuation permission and a vehicle usage period extension to the manager, and notifying content of refusal only when at least one of these permission and extension is refused.

16. A failure prediction information output control device comprising:

a failure prediction unit configured to predict a failure of a vehicle based on a vehicle signal that indicates characteristics of the vehicle;

a failure time estimation unit configured to estimate a time when the failure of the vehicle occurs based on the predicted failure;

a data base configured to store identification information of a management and repair participant of the vehicle who has an authority or an obligation to request for repair for the failure of the vehicle and is involved in the repair by receiving the request;

an occupant detection unit configured to detect an occupant of the vehicle and detect identification information of the detected occupant;

a judgment unit configured to judge that the occupant is a user who is not the management and repair participant of the vehicle by comparing the identification information of the occupant and the identification information of the management and repair participant of the vehicle; and an output control unit configured to:

notify a manager involved in management of the vehicle that the occupant is a user who is not the management and repair participant, output an instruction for the occupant to get out of the vehicle via a vehicle interior display unit, and perform an emergency stop of the vehicle.

* * * * *